United States Patent

[11] 3,593,313

[72] Inventors Carlos A. Tomaszewski
Canoga Park;
Timothy A. R. Goodliffe, Woodland Hills;
Norman J. Grannis, Los Angeles; Irving
Sperling, Van Nuys; Connable F. Wills,
Venice, all of, Calif.

[21] Appl. No. 885,020
[22] Filed Dec. 15, 1969
[45] Patented July 13, 1971
[73] Assignee Computer Design Corporation
Santa Monica, Calif.

[54] CALCULATOR APPARATUS
27 Claims, 16 Drawing Figs.

[52] U.S. Cl. .......... 340/172.5
[51] Int. Cl. .......... G06f 9/06, G06f 15/02
[50] Field of Search .......... 340/172.5; 235/157

[56] References Cited

UNITED STATES PATENTS

| | | | |
|---|---|---|---|
| 3,360,781 | 12/1967 | Boehnke | 340/172.5 |
| 3,341,819 | 9/1967 | Emerson | 340/172.5 |
| 3,487,369 | 12/1969 | King et al. | 340/172.5 |

*Primary Examiner*—Gareth D. Shaw
*Attorney*—Lindenberg and Freilich

ABSTRACT: An electronic calculator apparatus capable of storing a plurality of multidigit numbers and of performing operations with respect to those numbers. Operations are defined by two levels of instructions; i.e.; (1) a user level specified by keyboard actuations, and (2) an internal or microprogrammed level comprised of instructions primarily extracted from a program read-only memory. In operation, user or keyboard instructions initiate subroutines which are read from the program read-only memory and which may be comprised of a sequence of up to several thousand internal instructions. The calculator apparatus includes an alterable data memory comprised of a plurality of shift registers. Input and output control logic respectively control the flow of data to and from the data memory. The control logic is responsive to control information, read from a control read-only memory, specified by data modifying internal instructions delivered to an instruction register from the program read-only memory. Instruction codes can also be delivered to the instruction register from compiler logic responsive to keyboard actuations. The instruction sequence read from the program memory is defined by a program counter which is normally successively incremented by one. However, certain instructions can cause the program counter to skip, jump, or branch. When the program counter is caused to branch, the prior program count plus one is stored in a "last-in first-out" memory for later recall. The compiler logic functions to convert keyboard actuations presenting a problem in algebraic notation to a "Polish" notation required for calculator operation. A learn mode programmer can optionally be included for storing programs comprised of keyboard level or internal level instructions. The learn mode programmer can be loaded either from the keyboard or from some storage medium such as punched cards. Once the programmer has been loaded it is treated by the calculator just as if it constituted a portion of the program read-only memory.

INVENTORS
CARLOS A. TOMASZEWSKI
TIMOTHY A. R. GOODLIFFE
NORMAN J. GRANNIS
IRVING SPERLING
CONNABLE F. WILLS
BY
Lindenberg & Freilich
ATTORNEYS

CALCULATOR APPARATUS

FIELD OF THE INVENTION

This invention relates generally to an electronic calculator apparatus capable of storing a plurality of multidigit numbers and of performing operations with respect to those numbers as identified by keyboard actuations.

In recent years, many new electronic calculators have been introduced in the literature and have reached the market place. From an external appearance and user operation standpoint, most of these calculators share many of the same characteristics. For example, they generally have a keyboard comprised of both numeric keys and operation keys for respectively entering numbers and designating operations to be performed with respect to those numbers. In addition, they generally have some type of memory for storing data and some type of display (e.g., printer, CRT, Nixie-type tube), for displaying stored data. They are generally devoid of any moving electromechanical parts other perhaps, than in the printer and keyboard.

Some of the more complex calculators permit a certain degree of user programming. That is, some means is provided for storing a sequence of operation key actuations, which storage can be internally, as in a core memory, or externally, as on magnetic or punched cards. Once the user program has been recorded, the user thereafter need only define the values of the variables and the calculator will execute the program thus relieving the user of the need to repeatedly actuate the same sequence of operation keys.

Despite the gross similarities between known calculators, special features and internal configurations, of course, distinguish one machine from another.

SUMMARY OF THE INVENTION

The present invention is directed to an improved electronic calculator exhibiting certain operational features and internal characteristics not heretofore known.

Briefly, the present invention is directed to an electronic calculator apparatus employing two levels of instructions; namely, (1) a user level specified by keyboard actuations, and (2) an internal level comprised of instructions normally extracted from a dedicated program read-only memory. The program read-only memory contains a multiplicity of subroutines, each comprised of a plurality of internal level instructions. The internal level instructions consist of three different types; namely, (1) data modification, (2) address modification (branch, jump) and (3) control.

Generally, in response to a key actuation, a code representative of that key is loaded into an instruction register. Control logic responsive to the contents of the instruction register sets a program counter to a count which identifies a location in the program read-only memory from which the next instruction should be accessed. This next instruction normally constitutes a branch instruction causing the program counter to branch to a count storing the starting address of a subroutine required in the execution of the operation identified by the key actuation. The program counter will then continue to increment by one to successively read out instructions, one by one, from the program memory. The sequencing of the program counter will be modified only by the accessing of an address modification (branch, jump) code or by a control code which causes the program counter to skip upon the occurrence of certain conditions. In accordance with a significant aspect of the invention, a last-in-first-out program counter store is provided to store the program counter count plus one, in response to a branch instruction, for later recall.

Data is stored in a data memory comprised of a plurality of alterable data registers. Memory input and output control logic respectively control the flow of data to and from the data memory. In accordance with a significant feature of the invention, register select information is loaded into the memory input and output control logic from a dedicated control read-only memory in response to a data modification instruction appearing in the instruction register. The register select information supplied to the output control logic identifies a data register to be coupled to a data output bus. The data output bus is coupled to the input of an adder capable of operating in several different modes (e.g., no operation, add, subtract, add and repeat, etc. ). The data output of a particular one of the data registers, i.e., the accumulator, is always coupled to the input of the adder. In accordance with a further significant feature of the invention, the adder operation mode is also determined by information read from the control read-only memory. The register select information read into the memory input control logic identifies the data register to be updated Updating can occur, for example, from the adder output which presents both the data on the data bus and the sum of the data bus data and the accumulator data.

Control instructions read from the program memory appearing in the instruction register cause certain control actions to occur, such as (1) set or reset flags, (2) load index register, (3) cause the program counter to skip, etc.

In accordance with a further significant aspect of the present invention, compiler logic is incorporated between the keyboard and instruction register for the purpose of permitting a user to state his problem in terms of an algebraic notation while assuring that the instruction register receives the problem in terms of a Polish notation. More particularly, consider the following statement expressed in algebraic notation:

$$A+B=X$$

It is desirable to permit the user to present the foregoing problem to the calculator by the following sequence of key actuations:

1. Actuate numeric keys representing A (single or multidigit number). 2. Actuate ADD key. 3. Actuate numeric keys representing B (single or multidigit number). 4. Actuate = key.

The calculator is, of course, unable to perform an ADD operation when the ADD key is actuated because the value of B has not yet been stated. From an internal standpoint, the calculator must see the problem stated as: 1. Enter A. 2. Transfer A from entry to accumulator. 3. Enter B. 4. ADD.

The purpose of the compiler logic therefore is to accept a problem expressed by the user by keys sequentially actuated in accordance with an algebraic notation and after the sequence, in some instances, to express the same problem in Polish notation.

The invention is preferably embodied in a serial binary coded decimal (BCD) apparatus utilizing dynamic storage such as is characteristic of storage circuits implemented with MOS technology. Thus, all of the data registers constitute shift registers which are normally recirculating. The adder operates on four bits (one binary coded decimal digit) at a time and thus introduces a 4-bit delay. Accordingly, means are provided for short circuiting the first four bits of each data register when entering updated data therein from the adder.

The information read from the control and program read-only memories is read serially. In the case of the control memory, a control word is read therefrom in the form of a serial bit stream and is shifted through the memory input control logic, the memory output control logic and the adder control logic thus setting up all three to the desired bit configuration by the time the entire control word has been read out from the control memory. In the case of the program memory, the bits of an instruction word are read serially into the instruction register through a compiler output gate. When the compiler is active, it, rather than the program memory serially provides an instruction word to the instruction register through the compiler output gate. The compiler logic includes a keyboard decoder and three registers which enable a keyboard generated code to be delayed until a subsequent keyboard is produced. The compiler registers are controlled in a manner to effect the previously discussed notation conversion by logic which responds to a keyboard actuation in a manner dependent on a prior keyboard actuation.

In accordance with a further significant aspect of the invention, the read-only program memory previously discussed can optionally include an alterable portion which can be loaded by a user from either the keyboard or from some storage medium such as punched cards. When loaded from the keyboard, a program comprised of a sequence of codes representing keyboard instructions can be stored in the alterable portion of the program memory. When loaded from a storage medium, a program comprised of both keyboard instructions and internal instructions can be stored in the alterable portion of the program memory. In either case, the stored program can be executed by placing the calculator in a programmer run mode. Because the alterable portion is essentially part of the program memory, programs will be executed therefrom just the same as if the instructions were coming directly from the keyboard or read-only portion of the program memory. That is, a common program counter is used to address both the read-only and alterable portions of the program memory and a common instruction register is used to accept instructions from the read-only and alterable portions of the program memory. Moreover, keyboard codes accessed from the alterable program memory portion are diverted through the previously mentioned compiler logic just as if they were coming directly from the keyboard.

The novel features of the invention are set forth with particularity in the appended claims. The invention will be best understood from the following description when read in conjunction with the accompanying drawings.

DESCRIPTION OF THE PREFERRED EMBODIMENTS

General Description

Figure 1:
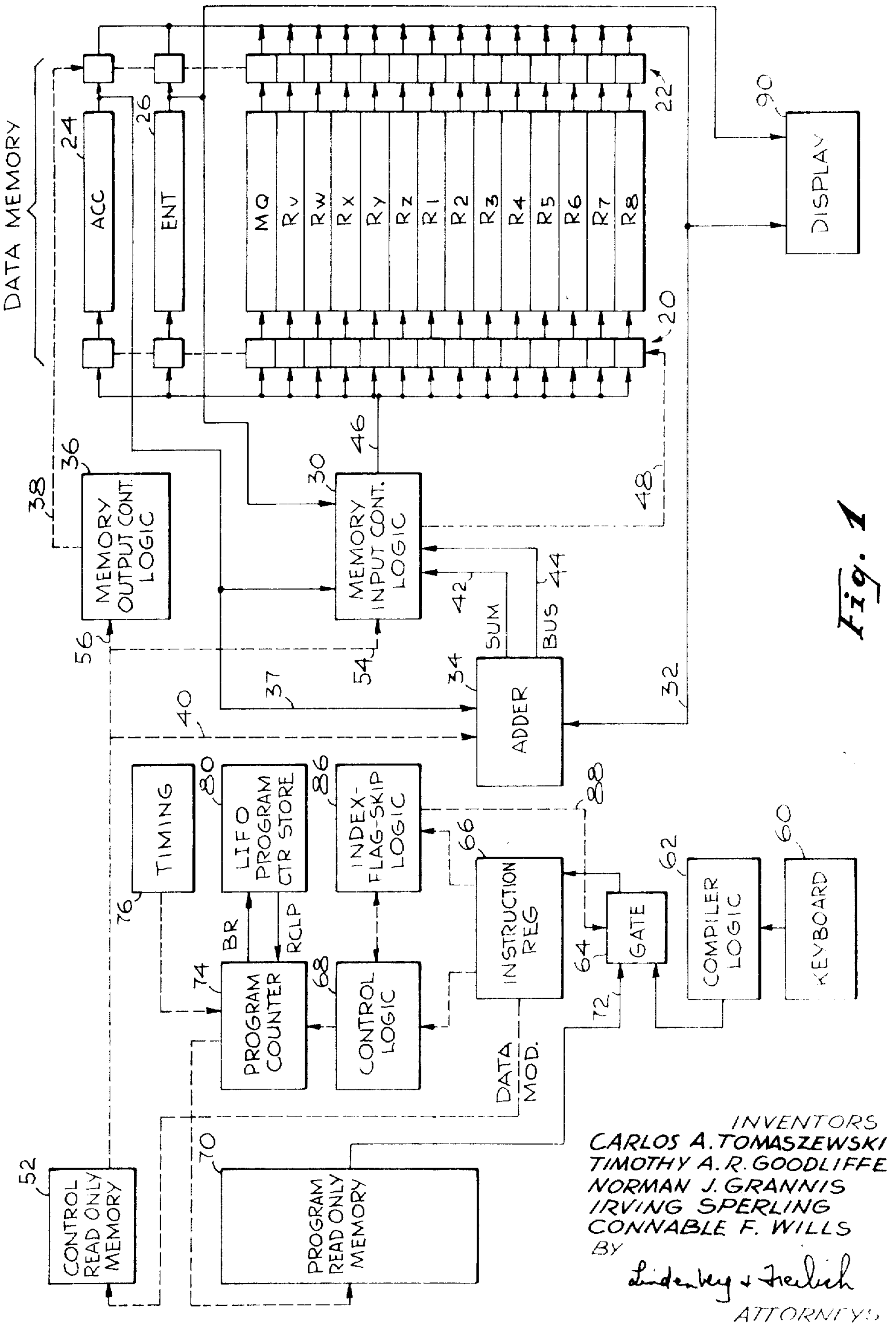
FIG. 1 is a block diagram of a calculator apparatus in accordance with the present invention.

Attention is now called to FIG. 1 which illustrates a block diagram of a calculator apparatus constructed in accordance with the teachings of the present invention. As shown, the calculator includes a data memory comprised of a plurality of multibit registers which, in accordance with the preferred embodiment of the invention, constitute shift registers. As illustrated, information is shifted into the left end of each register through register input gates 20 and out from each register through register output gates 22.

In the illustrated embodiment of the invention, 16 separate 72-bit data registers are provided. Of the 16 registers, two can be considered special in that the interconnections thereto differ somewhat from the other registers. The two special registers are the accumulator register 24 and the entry register 26. The other registers are respectively identified as MQ (multiplier-quotient), RO, RW, RX, RY, RZ and R1–R8.

Although not shown in FIG. 1, each of the data registers, other than the accumulator register 24, is provided with a circulation path directly connecting its serial output terminal to its serial input terminal to normally recirculate the data stored therein. In the case of the accumulator, as will be seen hereinafter, recirculation occurs through a memory input control logic means 30.

Prior to considering the memory input control logic means 30, it is pointed out that the output terminals of all of the register output gates 22 are connected to a common data output bus 32 which in turn is coupled to the input of an adder 34. The register output gates 22 are controlled by a memory output control logic means 36 via the control line 38.

Parenthetically, it is pointed out that flow paths in FIG. 1 primarily used for data are illustrated in solid line while paths intended to be used essentially for control are represented by dotted line, as dotted line 38. As will be seen hereinafter, the function of the memory output control logic 36 is to enable selected register output gates 22 as identified by register select information applied to the control logic means 36. In other words, the memory output control logic means 36 causes the output of one data register at a time to be applied to the data output bus 32.

Although the output of each of the registers can be coupled to the data output bus 32 under the control of the output control logic means 36, the output of the accumulator 24 is in addition, always applied to the input 37 of adder 34. Thus, the contents of the accumulator 24, as well as the contents of any one of the other registers applied to the data output bus 32 are available at the input to the adder 34. As will be seen hereinafter, the adder is capable of operating in several different operational modes as specified by control information applied thereto via control path 40. The adder has two principal output terminals respectively identified in FIG. 1 as SUM and BUS. The SUM output terminal 42 will provide the sum of or difference between the numbers applied to the two data input terminals of the adder. The BUS output terminal 44 merely provides the same information as was applied to the adder 34 via the data output bus 32. However, for reasons which will be better appreciated hereinafter, the information provided on the BUS output terminal 44 is delayed in time by four bits, the length of a binary coded decimal digit, as compared to the information on data output bus 32.

The adder output terminals 42 and 44 are coupled to the data input of the memory input control logic means 30. Additionally, the output of the accumulator 24 and the output of the entry register 26 are also coupled to the data input of the memory input control logic means 30. Thus, the memory input control logic means 30 is able to selectively provide on its data output terminal 46, the contents of (1) the accumulator, (2) the entry register, (3) the sum or difference of the contents of the accumulator and data output bus information, and (4) the data output bus information. The memory input control logic means 30 controls the register input gates 20 via dotted line path 48 to thus effectively couple the data output line 46 to the input of any one of the 16 registers.

It has been mentioned that mode control information is applied to the adder via dotted line path 40. This mode control information is derived from a control memory 52 which preferably comprises a read-only memory. The control read-only memory 52 additionally provides register select information to the input terminals 54 and 56 of the memory input control logic 30 and memory output control logic 36, respectively.

As is true of essentially all known electronic calculators, a keyboard means 60 is provided to enable information in the form of single or multidigit decimal numbers to be stored in the data memory registers. Additionally, the keyboard 60 enables a user to identify operations to be performed with respect to the numbers stored in the various data memory registers. The various keyboard keys will be discussed in detail hereinafter. At this point, however, it is merely pointed out that the actuation of each keyboard key generates a key code (6 bits) which is coupled through compiler logic means 62 to a gate 64. The output of the gate 64 is applied to the input of an instruction register 66. The instruction register 66 is used to store instructions which cause, among other things, a control logic means 68 to take certain actions. Prior to proceeding to a discussion of the various actions taken in response to the entering of an instruction into the instruction register 66, it is pointed out that a second source of information for the instruction register 66 constitutes the output of a program memory 70. As with the control memory 52, the program memory 70 is preferably of the read-only type. The output of the program memory is coupled to a program memory output bus 72 which is coupled to the input of the gate 64 whose output feeds the instruction register 66. It is pointed out that the gate 64 passes the output of the compiler logic 62 to the instruction register only during the first full memory cycle following a key actuation. During all other cycles, the gate 64 passes the output of the program memory to the instruction register.

The entire internal instruction repertoire of up to 256 instructions will be discussed in detail hereinafter. However, suffice it to say at this point that each of the instructions falls into one of three categories; namely (1) address modification such as branch or jump, (2) data modification, and (3) control.

Prior to considering address modification instructions, it is pointed out that an 11-bit program counter 74 is provided capable of defining a plurality of counts, each corresponding to a different one of the 2048 addressable locations in the program memory 70. In response to the program counter designating a particular location in the program memory 70, the instruction stored in that location is read out and coupled through the gate 64 to the instruction register. Normally, the program counter 74 is incremented by one for each instruction cycle as controlled by a timing means 76. In this manner, the instructions of a particular subroutine stored in the program memory 70 will be read out in sequence into the instruction register 66. However, address modification instructions such as branch or jump entered into the instruction register 66 will be recognized by the control logic 68 and modify the sequencing of the program counter 74. Thus, the accessing of a jump instruction (which designates a program memory address) will cause the program counter to jump to the count corresponding to the designated address to access the succeeding instruction from memory. As noted, in the absence of an address modification instruction (or a skip instruction which is one of the control category instructions to be discussed hereinafter) the program counter 74 will continue to be incremented by one for each instruction cycle to read instructions from successive locations in the program memory 70. A branch instruction differs from a jump instruction in that it causes the present program counter count plus one to be stored for later recall. That is, when a branch instruction is loaded into instruction register 66, not only does the program counter 74 branch to the designated address, but in addition, the control logic 68 first causes the program counter to store its present count plus one in a last-in first-out program counter store 80. In response to a subsequent recall program count (RCLP) instruction, extracted from the program memory 70, the program counter store 80 will return the most recently stored program count to the program counter 74.

We have thus far seen that instructions can be entered into the instruction register 66 through gate 64 from either the compiler logic means 62 (during the first memory cycle following a key depression) or from the program memory output bus 72. As will be seen hereinafter, a keyboard actuation provides a 6-bit code which causes an instruction to be loaded into the instruction register 66 to in turn cause the execution of one or more subroutines, each of which can be comprised of a sequence of very many internal instructions which are accessed in sequence from the program memory 70.

Address modification instructions have been briefly discussed. Another instruction category constitutes data modification instructions which as a general rule effect the data stored in the data registers. Data modification instructions are executed by causing the control read-only memory 52 to load information into the memory input control logic means 30, the memory output control logic means 36 and the adder 34. Thus, consider for example, the appearance of an ADDN (add numeric) instruction in the instruction register. This instruction is intended to add the numeric portions (mantissas) of the numbers stored in the accumulator and entry registers and to store the sum in the accumulator. In order to accomplish this, the instruction causes a control word to be read out of the control memory 52 providing information to the memory output logic which couples the entry register output to the data output bus 32. Additionally, the control word read from the control memory 52 will define the add mode for the adder 34 and will identify the accumulator register for the memory input control logic 30.

The third category of instructions constitutes control instructions which can cause various actions to take place such as load index registers, set flags, reset flags, etc. In the generalized block diagram of FIG. 1, block 86 has been utilized to encompass the index-flag-skip logic means. Both the logic means 68 and 86 are illustrated in FIG. 1 as being responsive to information appearing in the instruction register. Additionally, as shown in FIG. 1, the compiler gate 64 is controlled via path 88 by flags within the logic means 86.

Prior to considering the structure of the blocks of FIG. 1 in somewhat greater detail, the keyboard level instruction repertoire and the internal level instruction repertoire will be considered. It is pointed out that reference to the term keyboard level instruction refers to a user specified instruction identified as a consequence of keyboard action. On the other hand, internal level instructions are instructions stored and accessed from the program memory 70 of which the user may have no awareness.

Prior to leaving FIG. 1, it is merely pointed out that as with most other calculators, provision is made for displaying the contents of at least some of the registers. Accordingly, a display means 90 is illustrated which normally accepts input from the entry register, but which may accept input information from the data output bus 32. The display 90 is responsive to the control logic 68, which as will be seen, cam respond to certain internal instructions to control the display 90.

Keyboard

Figure 2:
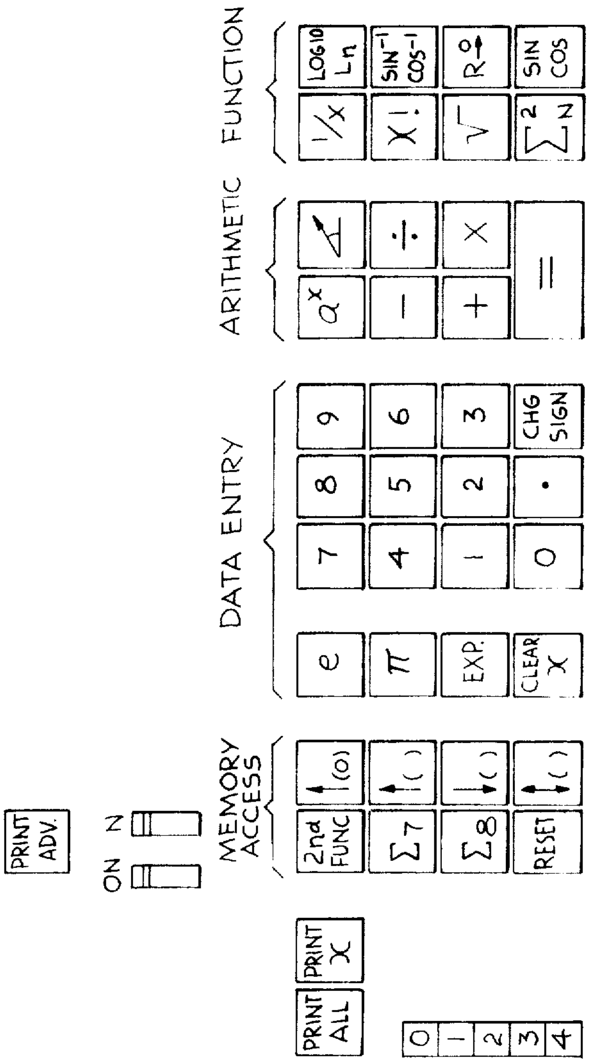
FIG. 2 is a diagram illustrating the keyboard of FIG. 1 in greater detail.

Attention is now called to FIG. 2 which illustrates the keyboard 60 in greater detail. The various keys can be grouped into four categories as follows:

a. Data entry keys (Numeric 0 through 9, ., CHG SIGN, EXP, $\pi$, $e$)

b. Arithmetic keys (+, −, ×, ÷, $a^x$, $\sqrt[x]{\ }$, =)

c. Memory access keys (↓(), ↑(), ↕(), ↑($o$), $\bar{\bar{\Sigma}}_7$, $\bar{\bar{\Sigma}}_8$, 2nd FUNC)

d. Function keys (SIN/COS, $SIN^{-1}/COS^{-1}$, R→°, $LOG_{10}$/ ln, $1/x$, $\sqrt{\ }$, X!, $\Sigma_x^2$)

In the preferred embodiment, the program memory is arranged so that data is entered from left to right (most to least significant) into the entry (E) register by actuation of the data entry keys. The data may be operated on by pressing an arithmetic key or a function key, or the data may be stored in one of the data memory registers for later recall by pressing that appropriate memory access key. Each data register can contain a single data item which can consist of up to a 15-digit binary coded decimal mantissa, a 2-digit binary coded decimal exponent, a mantissa sign and an exponent sign. Direct access for data retrieval to registers R0 and R9 is provided by keys ∶ (o) (recall 0) and 2nd FUNC. respectively.

As will be better understood hereinafter, the calculator operation is algebraic, thus permitting several functions to be executed in sequence. Data entries, storing and recalling of partial results from the data registers may be interspersed with computational instructions. Use of various operational registers within the calculator is fully automatic and need not be manipulated by the user. The sequence of data entries (operands) and operators follows the same rules as writing algebraic expressions. For example, the following expression can be evaluated on the calculator using the steps indicated:

$$y=\sqrt{\frac{(7\times 6)+8}{2}}$$

| Step | a | b | c | d | e | f | g | h | i | | j | |
|---|---|---|---|---|---|---|---|---|---|---|---|---|
| Key | CLEAR X | 7 | x | 6 | + | 8 | ÷ | 2 | = | | √ | — |
| E Reg | 0 | 7 | 7 | 6 | 6 | 8 | 8 | 2 | 2 | 25 | 25 | 5 (Result) |

Note in the example that the algebraic sequence was terminated by an equals operation before the square root function. All algebraic sequences must be terminated by an equals instruction or by a computational instruction that contains an implied equals such as $\overline{\overline{\Sigma}}_7$, and $\overline{\overline{\Sigma}}_8$.

Internal Instructions

Appendix Table I set forth hereinafter lists each of the keys illustrated in FIG. 2 and describes the function thereof as well as identifying the 6-bit code generated thereby.

In describing the overall calculator as represented in FIG. 1, reference has been made to an internal instruction repertoire. The internal instructions are organized in the program memory 70 to define various subroutines, some of which will be discussed in detail hereinafter. In the illustrated embodiment of the invention, each internal instruction constitutes an 8-bit word with the bit positions being respectively designated: 1, 2, 4, 8, A, B, C, D, from least to most significant. Each of the 256 possible internal instructions falls into one of the three previously mentioned categories; namely, address modification, data modification, or control. Reference is now made to Table II which illustrates the internal instruction mnemonic for each of the 8-bit instruction codes. Table II is arranged in two parts. The upper part constitutes a matrix illustrating the 128 different codes used for data modification and control instructions. The left most four columns of the matrix contain data modification instructions while the right most four columns contain control instructions. More particularly, note that if the bits A, B, C, D of an instruction match one of the following four patterns, then the instruction constitutes a data modification instruction:

| 1 | 2 | 4 | 8 | A | B | C | D |
|---|---|---|---|---|---|---|---|
| X | X | X | X | 0 | 0 | 0 | 0 |
| X | X | X | X | 1 | 0 | 0 | 0 |
| X | X | X | X | 0 | 1 | 0 | 0 |
| X | X | X | X | 1 | 1 | 0 | 0 |

If the bits A, B, C, D of an instruction match one of the following four patterns, then the instruction constitutes a control instruction:

| 1 | 2 | 4 | 8 | A | B | C | D |
|---|---|---|---|---|---|---|---|
| X | X | X | X | 0 | 0 | 1 | 0 |
| X | X | X | X | 1 | 0 | 1 | 0 |
| X | X | X | X | 0 | 1 | 1 | 0 |
| X | X | X | X | 1 | 1 | 1 | 0 |

In the second or lower part of Appendix Table II, the instruction format for address modification codes is illustrated. Recall that the address modification instructions consist of branch instructions and jump instructions. Branch instructions are designated when the bits in positions C and D of an instruction word are both one. Jump instructions are designated when the bits in bit positions C and D are respectively, zero, one. In the case of either the branch or jump instruction, the least significant six bits, (1, 2, 4, 8, A, B) of the instruction indicate the extent to which the instruction modifies the count in the program counter 74 of FIG. 1. In the illustrated embodiment of the invention, the program counter 74 contains 11 bits thereby enabling it to designate any one of up to 2,048 program memory locations.

As previously indicated, the least significant six bits of an address modification instruction determine the extent of modification to the program counter. The branch instruction modifies bits 5—10 of the program counter resetting bits 1—4 to zero. Program counter bit 11 is determined by a change page flag which merely represents whether instructions are accessed from the first or second half of the program memory. The jump instruction modifies the six least significant bits of the program counter, leaving the most significant five bits unmodified.

Appendix Table III lists each of the 128 data modification and control instructions and indicates the mneumonic and describes the operation performed by each of those instructions.

Timing

Figure 3A:
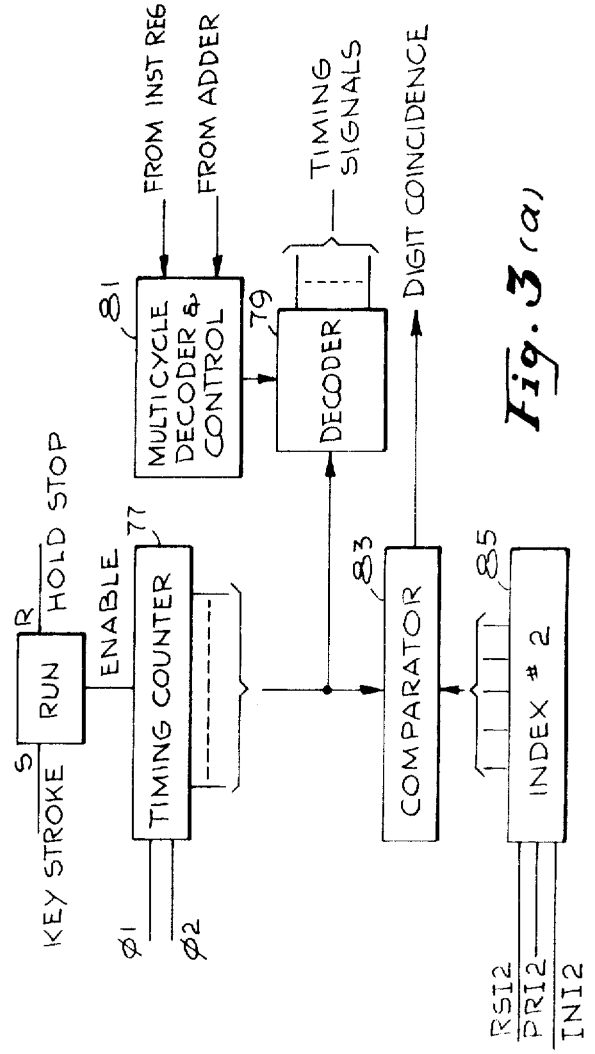
FIG. 3(*a*) is a block diagram illustrating the timing means of FIG. 1 in greater detail and FIG. 3(*b*) is a timing chart illustrating the time occurrence of various control actions.
Figure 3B:
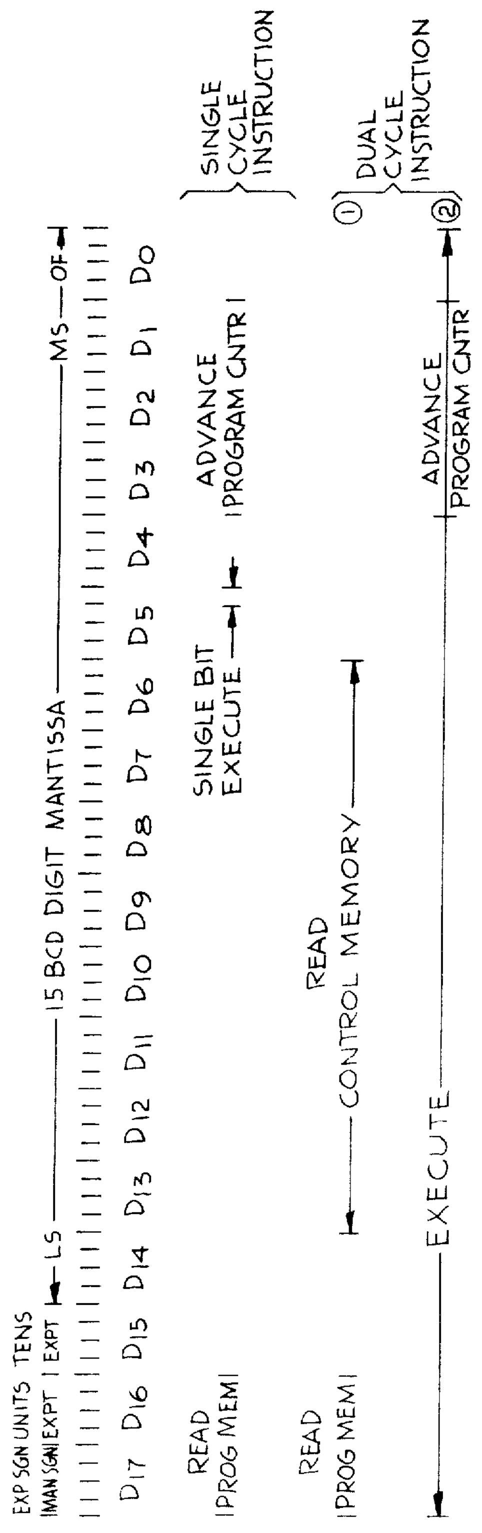

Attention is now called to FIG. 3(*a*) which illustrates the timing means 76 of FIG. 1 in greater detail. Timing means 76 includes a timing counter 77, responsive to alternately occurring first and second-phase clock signals Φ1 and Φ2, which cyclically defines 18 digit periods $D_0$—$D_{17}$, as shown in FIG. 3(*b*). Each digit period contains 4-bit periods thus enabling one 4-bit binary coded decimal digit to be handled during each digit period. The timing counter cycle is therefore 72-bit periods long which corresponds to the length of the data registers. Thus, one memory cycle, i.e., the time it takes to access a stored data item, is equal to one cycle of timing counter 77. As shown in FIG. 3(*b*), each data item is formatted such that fifteen BCD digits of a mantissa are available during digit periods $D_0$—$D_{14}$, two BCD digits of an exponent are available during digit periods $D_{15}$ and $D_{16}$, the mantissa and exponent signs are available during digit period $D_{17}$.

The output of the timing counter 77 is coupled to a decoder 79 which provides various timing control signals. The decoder 79 is also responsive to multicycle decoder and control means 81. Many internal instructions, such as set flag instructions, can be executed in a single memory cycle, and for these instructions the decoder 79 will provide the timing signals identified in FIG. 3(*b*). That is, a read program memory control signal will be available during digit period $D_5$ and an advance program counter signal will be available during digit periods $D_1$—$D_3$.

Some internal instructions cannot be executed during a single memory cycle. For example, data modification instructions require at least two cycles; i.e., one cycle to extract the control information from the control memory 52 and a second cycle to modify the data. Dual memory cycle instructions appearing in the instruction register 66 are recognized by the multicycle decoder and control means 81 to cause the decoder 79 to produce the control signals as shown in FIG. 3(*b*). That is, during a first cycle, a read program memory signal is produced during digit periods $D_{16}$ and $D_{17}$, and a read control memory signal is produced during digit periods $D_6$—$D_{13}$ to permit 32 bits to be serially read out of the control memory to the memory output control logic 36, the memory input control logic 30 and the adder 34 as shown in FIG. 1. During a second cycle, the data is modified and during digit periods $D_1$—$D_3$ of the second cycle, the program counter is advanced.

Some instructions, such as ADRP (add and repeat) and SBRP (subtract and repeat) require more than two cycles. These instructions are recognized by the adder and cause the decoder and control means 81 to apply a hold to the decoder 79 to therefore keep it in an execute mode and prevent it from advancing the program counter.

The timing means of FIG. 3(*a*) also includes a comparator 83 which can compare the digit period as defined by counter 77 with a count which can, under program control, be entered into an index 02 register 85. As will be seen, the index 02 register is responsive to instructions RSI2 (reset index 02), PRI2 (preset index 02) and INI2 (increment index 02). Thus, information can be entered into the index 02 register to select a particular digit which will be identified by the provision of a digit coincidence signal from comparator 83.

Instruction Register and Program Counter

Figure 4:
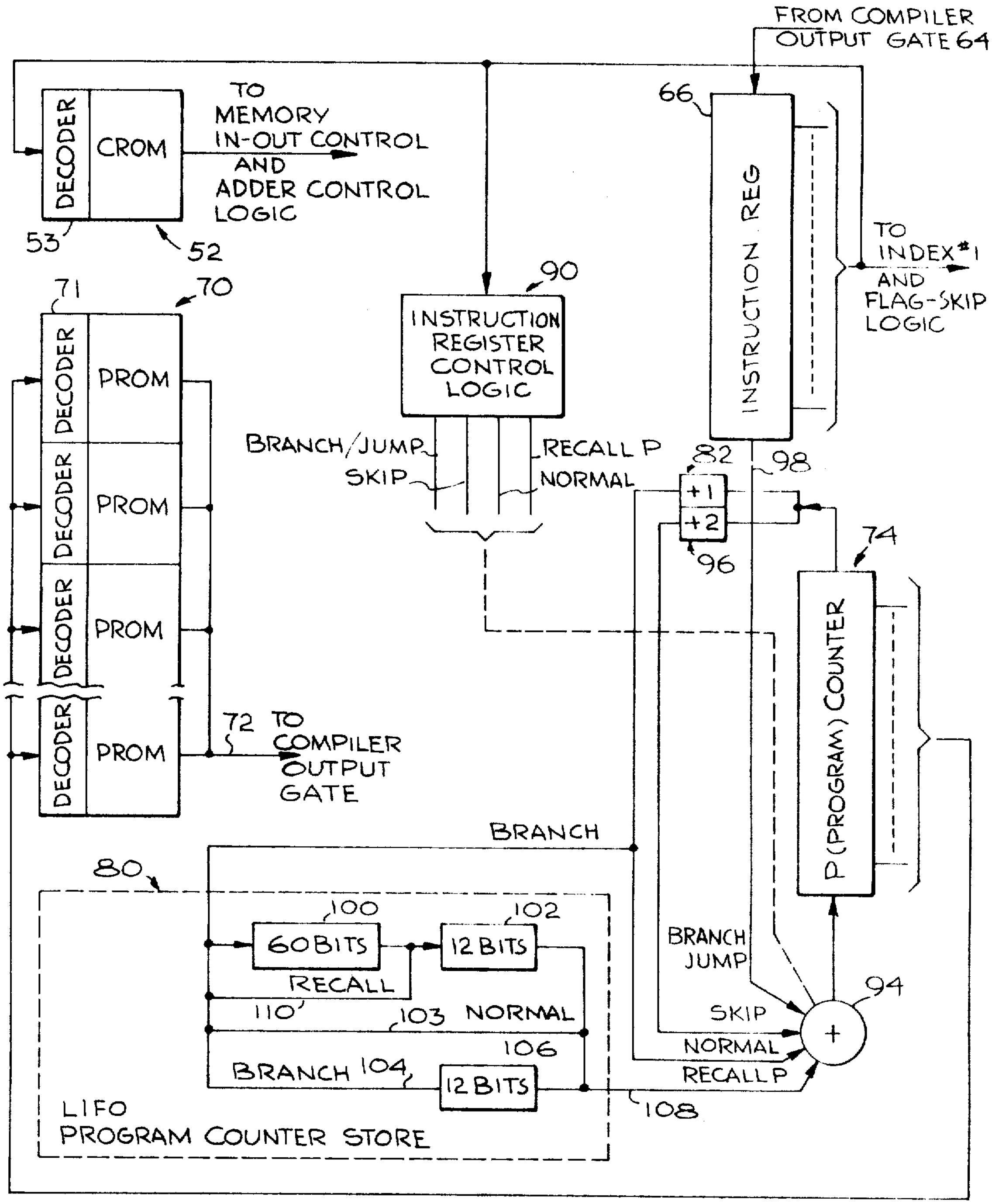
FIG. 4 is a block diagram illustrating the instruction register and program counter portion of the calculator of FIG. 1 in greater detail.

Attention is now called to FIG. 4 which illustrates the instruction register and program counter portion of the calculator of FIG. 1 in greater detail. The instruction register 66 of FIG. 4 preferably constitutes an 8-bit shift register which, as previously indicated, receives its input from the output of a compiler output gate 64. Parallel output is available from the instruction register 66 to cause actions to occur within the index and flag-skip logic. For example only, assume that the instruction code (from bit position 1 to bit position D) is 00001110 representing the SFLF instruction. This instruction is intended to set a flag F. Decoding means which will be discussed hereinafter in conjunction with FIG. 9, recognizes the instruction code within the register 66 and sets the flag F. Most control instructions will be executed in a single memory cycle as has been described in conjunction with FIGS. 3(*a*) and (*b*).

Data modification instructions will also be responsive to the parallel output of the instruction register 66. For example, consider the instruction (from position 1 to position D) 01000000 which designates the XCEA instruction calling for an exchange between the contents of the entry and accumulator registers. This instruction is recognized by the decoder 53 of the control memory 52 and causes a 32-bit control word to be read out of a particular control memory location identified by the XCEA code. The control word read out contains the appropriate bit patterns to set up the previously referred to memory input control logic means 30 and memory output control logic means 36 to exchange the contents of the entry and accumulator registers. The various control words read out of the control memory 52 in response to each of the data modification instructions will be set forth hereinafter in conjunction with the explanation of the adder 34.

With continuing reference to FIG. 4, the action of the program counter 74 will now be considered. As previously pointed out, the program counter 74 is an 11-bit counter which is thus able to define any one of 2,048 combinations, each designating a different location in the program memory 70. Although the program memory has been illustrated in FIG. 4 as being comprised of a plurality of identical program memory modules, for operational purposes, it will suffice to consider the program memory 70 as one large memory having a single decoding means 71 associated therewith. The program memory decoding means 71 is responsive to the 11 bits presented thereto in parallel by the program counter 74. As a consequence of the program counter identifying one of the locations in the program memory 70, the contents of that location, i.e., an 8-bit instruction, will be read out and applied to a program memory bus 72 which in turn is coupled to the compiler output gate 64 as shown in FIG. 1.

With continuing reference to FIG. 4, an instruction register control logic means 90 is provided to recognize when any instruction appears in the instruction register 66 calling for a modification of the program counter. As previously pointed out, the most significant instructions which cause a modification of the program counter constitute the address modification instructions branch and jump. However, additionally, certain control instructions are intended to cause the program counter to skip if certain conditions exist. Additionally, the instruction register control logic means 90 must also sense a RCLP (recall program count) instruction. Aside from the branch/jump, skip and recall P instructions, all other instructions can be considered as normal instructions. In the event of a normal instruction, the count in the program counter 74 is serially shifted through an "add 1" summing circuit 92 and returned to the program counter input via gate 94. In the event a skip instruction appears in the instruction register 66 and the appropriate conditions prevail, then the instruction register control logic means 90 will cause the gate 94 to pass the output of the "add 2" circuit 96 rather than the "add 1" circuit 92.

In other words, the count in the program counter 74 will normally be shifted out of its output terminal, incremented by one, and returned via gate 94 to the program counter input. In the case of a skip instruction and if the conditions for skip are met, the count will be shifted out of the program counter 74, incremented by two by the circuit 96 and then returned through the gate 94 to the program counter 74.

In the case of a branch or jump instruction, six bits from the instruction appearing in the instruction register 66 are outputted via path 98 to the gate 94. Thus, as the appropriate bits of the program counter count are recirculated, they are replaced by the appropriate bits of the branch or jump instruction. It will be recalled from the lower half of Table II that in the case of the branch instruction, the six least significant bits of the branch instruction code are substituted for bits 5—10 of the program count with bits 1—4 being switched to zero. In the case of the jump instruction the six least significant bits of the jump instruction code are used to replace bits 1—6 of the P counter count.

Execution of the branch instruction also differs from the jump instruction in that the branch instruction must cause the present count of the program counter plus one to be stored for later recall. This function is performed by the "last-in, first-out" (LIFO) program counter store 80. The LIFO program counter store includes a 72-bit shift register and is thus adapted to store six 12-bit groups (each 12-bit group is comprised of an 11-bit P count plus one spare bit). More particularly, the 72-bit shift register is comprised of a 60-bit portion 100 and a 12-bit portion 102. The information contained within the 72 bits of the shift register portions 100 and 102 normally continue to recirculate once each memory cycle through the 72 bits along the path 103 marked NORMAL. In the event a branch instruction is recognized, then the present program count plus one emerging from the "add 1" circuit 92 is applied to the input of the 60-bit shift register portion 100. Additionally, the output from the 12-bit portion 102 is diverted from the normal path 103 to a special branch path 104 including a 12-bit delay 106. Once the new program count plus one has been entered into the shift register portion 100, the branch instruction is terminated, opening the path 104 and reestablishing the normal path 103. Thus, the timing on the program counter store 80 is controlled so that as each new program count plus one is entered therein, it is entered immediately following the previously entered count. The earliest entered 12-bit count is the one that is shunted to the 12-bit delay 106 from which it cannot be recalled.

After a subroutine has been executed and it is desired to return to the program count succeeding the count at which branching took place, an RCLP (recall program count) instruction is entered into the instruction register 66. The logic means 90 recognizes the recall P instruction and causes the gate 94 to pass the recall P input 108 into the program counter 74. That is, the 11-bit P count of the 12-bit group emerging from shift register portion 102 is loaded into the program counter via gate 94 in response to a recall P instruction. It is, of course, necessary to drop a program count from the program counter store 80 after it has been recalled and as a consequence a recall path 110 is provided around the 60-bit shift register portion 100 of the program counter store 80. Thus, in response to a recall P instruction, the output of the 60-bit shift register portion 100 is coupled directly back to its input and not through the 12-bit portion 102. This has the effect, of course, of shifting the 12 bits out of the portion 102 to the program counter while inhibiting any input to the portion 102 until execution of the recall P instruction has been completed.

Memory Input Control Logic

Figure 5:
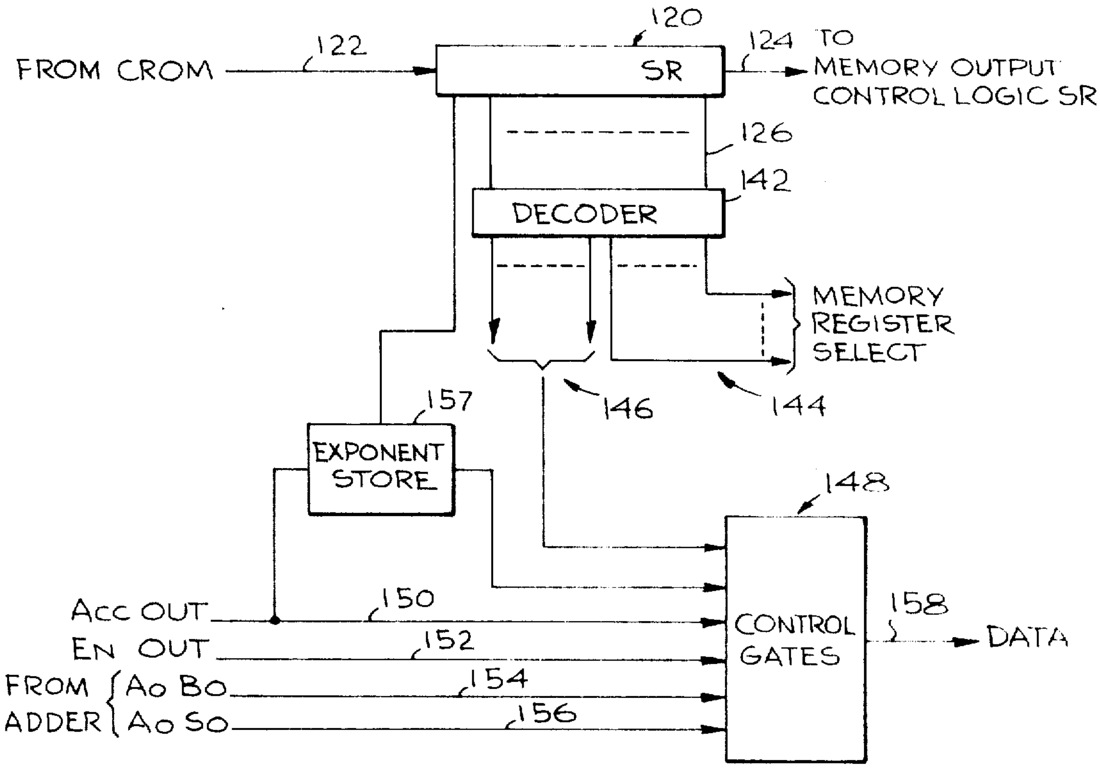
FIG. 5 is a block diagram illustrating the memory input control logic of FIG. 1 in greater detail.
Figure 8:
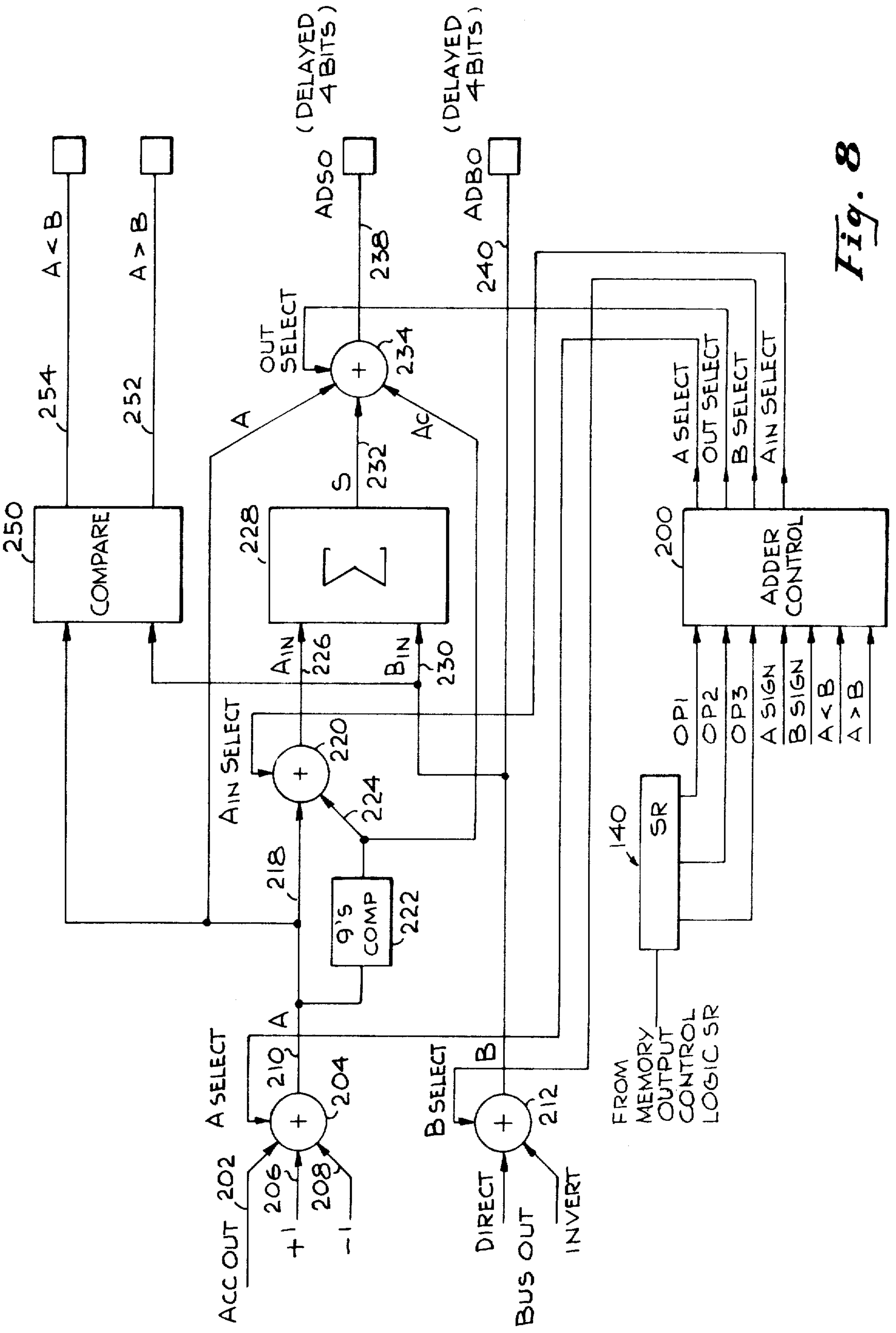
FIG. 8 is a block diagram illustrating the adder of FIG. 1 in greater detail.

Attention is now called to FIG. 5 which illustrates the memory input control logic 30 of FIG. 1 in greater detail. The memory input control logic includes a 10-bit shift register 120 having a serial input terminal 122 and a serial output terminal 124. Additionally, the bits stored in the shift register 120 are available in parallel on output lines 126. Information loaded into the shift register 120 of the memory input control means 30 identifies from where the updated data to be entered into a register is to be taken as well as the register to be updated. From what has been said thus far, it will be recognized that the data entered into the shift register 120 is derived from the control memory 52 in response to data modification instructions appearing in the instruction register 66. That is, a data modification instruction appearing in the instruction register 66 identifies a location in the control memory 52 causing the control word stored in that location to be read out. In accordance with the preferred embodiment of the invention, the bits of the control word are read out serially and are shifted through the shift register 120 of the memory input control logic and then through a shift register 130 of the memory output control logic (FIG. 6) and into a shift register 140 of the adder control logic (FIG. 8). Each control word is comprised of 32 bits with the last 10 bits constituting spares. Of the first 22 bits, the first three bits are ultimately shifted into the shift register 140 of the adder control logic, the next nine bits are ultimately shifted into the shift register 130 of the memory output control logic 36, and the last 10 bits ultimately coming to rest in the shift register 120 of the memory input control logic 30.

Table IV illustrates the 64 control words stored in the control memory 52 and indicates which control word is read therefrom in response to each of the 64 data modification instructions.

The 10 bits of the control word (i.e., bits 13—22) read into the shift register 120 of the memory input control logic 30 define which available updated information is to be entered into the data memory and which of the data memory registers is to be updated. In order to execute a data modification instruction, a decoder means 142 is provided which is responsive to the parallel output of the shift register 120. The decoder 142 has essentially two sets of control output terminals. The first set 144 is responsive to the register select information within the 10 bits in the shift register 120 to control the input gates 20 of FIG. 1 to select which of the 16 registers is to be updated. The second set of control output terminals 146 emerging from decoder 142 controls the functioning of a control gating means 148. More particularly, data from four distinct sources is available at the data input of the control gating means 148. That is, the output of the accumulator register 24 is applied to data input terminal 150. The output of the entry register 26 is applied to data input terminal 152. Additionally, the two outputs 42 and 44 of the adder 34 are applied to input terminals 154 and 156 of the control gating means 148. An exponent store 157 (12-bit shift register) can accept a pair of exponent digits (8 bits) from the data input terminal 150 and in turn can apply the exponent digits via control gates 148 to a selected register. The configuration of the 10-bit pattern stored in the shift register 120 determines which of the four data input lines 150, 152, 154 and 156 is coupled to the data output line 158 of the control gating means 148. As previously noted, the configuration of the 10-bit pattern in the shift register 120 determines via decoder 142 and the output lines 144 thereof to which of the 16 data registers, the data available on control gating means output terminal 158 is directed.

More particularly, bits 13 and 14 of the control word define a 4-bit group of data registers, i.e., registers 1—4 or 5—8 or 9—12 or 13—16. Bits 15 and 16 define the register in the selected group to which the adder bus output will be coupled. Bits 17 and 18 define an operation with respect to the data appearing on input lines 150, 152 or 154. That is, bits 17 and 18 can define either (1) recirculate, (2) shift right, (3) shift left, or (4) update. A right shift is utilized in conjunction with both the accumulator and entry registers in response to the SHRA and SHRE instructions. A right shift occurs by introducing the undelayed data item into the gates 174 (to be discussed hereinafter), short circuiting the first four bits of the accumulator or entry registers. A left shift in the accumulator occurs in response to the SHLA instruction by introducing a delayed data item into the serial input of the 4-bit portion of the accumulator register. As previously noted, updating without shifting occurs by introducing delayed data items (i.e., from the adder as will be explained hereinafter) into the gates 174 short circuiting the initial 4-register bits. Control word bits 19 and 20 identify the register in the group selected by bits 13 and 14 into which the data appearing on the input line 156 is coupled. Bit 21 defines whether the contents of the register identified by bits 19 and 20 should be recirculated or updated. Bit 22 is used to control the exponent store 157. For example, bit pattern 00 in bit positions 21 and 22 merely recirculates. Pattern 01 causes updating from input terminal 156. Pattern 10 defines recirculation but also defines load exponent store 157. Pattern 11 causes updating of the data item exponent on input 156 from the exponent store 157.

Memory Output Control Logic

Figure 6:
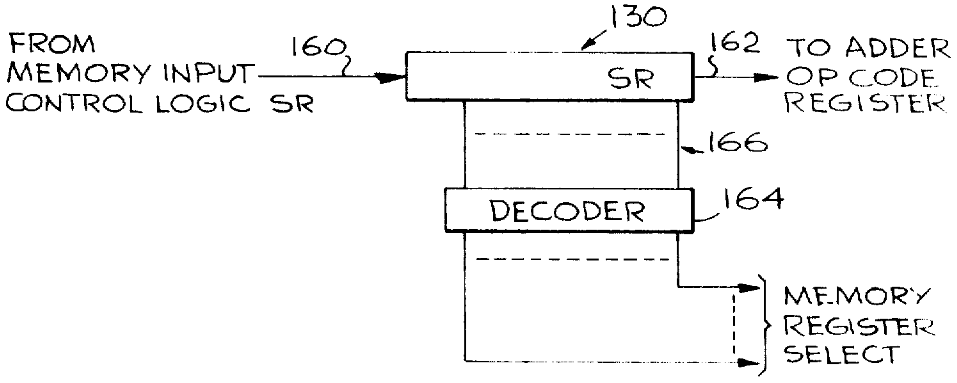
FIG. 6 is a block diagram illustrating the memory output control logic of FIG. 1 in greater detail.

Attention is now called to FIG. 6 which illustrates the memory output control logic 36 of FIG. 1 in greater detail. As previously noted, the memory output control logic includes a shift register 130 having a serial input terminal 160 and a serial output terminal 162. The serial input terminal 160 serially receives bits from the output terminal 124 of shift register 120. The serial output terminal 162 provides bits to the shift register 140 of the adder control logic shown in FIG. 7. Ultimately, a 9-bit pattern is loaded into shift register 130 which is available in parallel to decoder 164 on output lines 166. The decoder 164 responds to the bit configuration in the shift register 130 to enable the appropriate data memory output gate 22 of FIG. 1 which couples the output of one of the data registers to the data output bus 32.

Control word bits 4—12 are loaded into shift register 130 to control the memory output control logic. Bits 9—12 specify which of the 16 registers should be coupled to the data output bus 32. Two bits (7 and 8) define one of the following four possible special instructions: (1) no special, (2) change sign, (3) increment exponent, (4) decrement exponent. Bits 5 and 6 define one of the following four time intervals: (1) no time, i.e., disabled, (2) all times, i.e., $D_0$—$D_{17}$, (3) exponent and sign time, (4) mantissa and sign time. Bit 4 enables the accumulator input to the adder 34.

Data Memory

Figure 7:
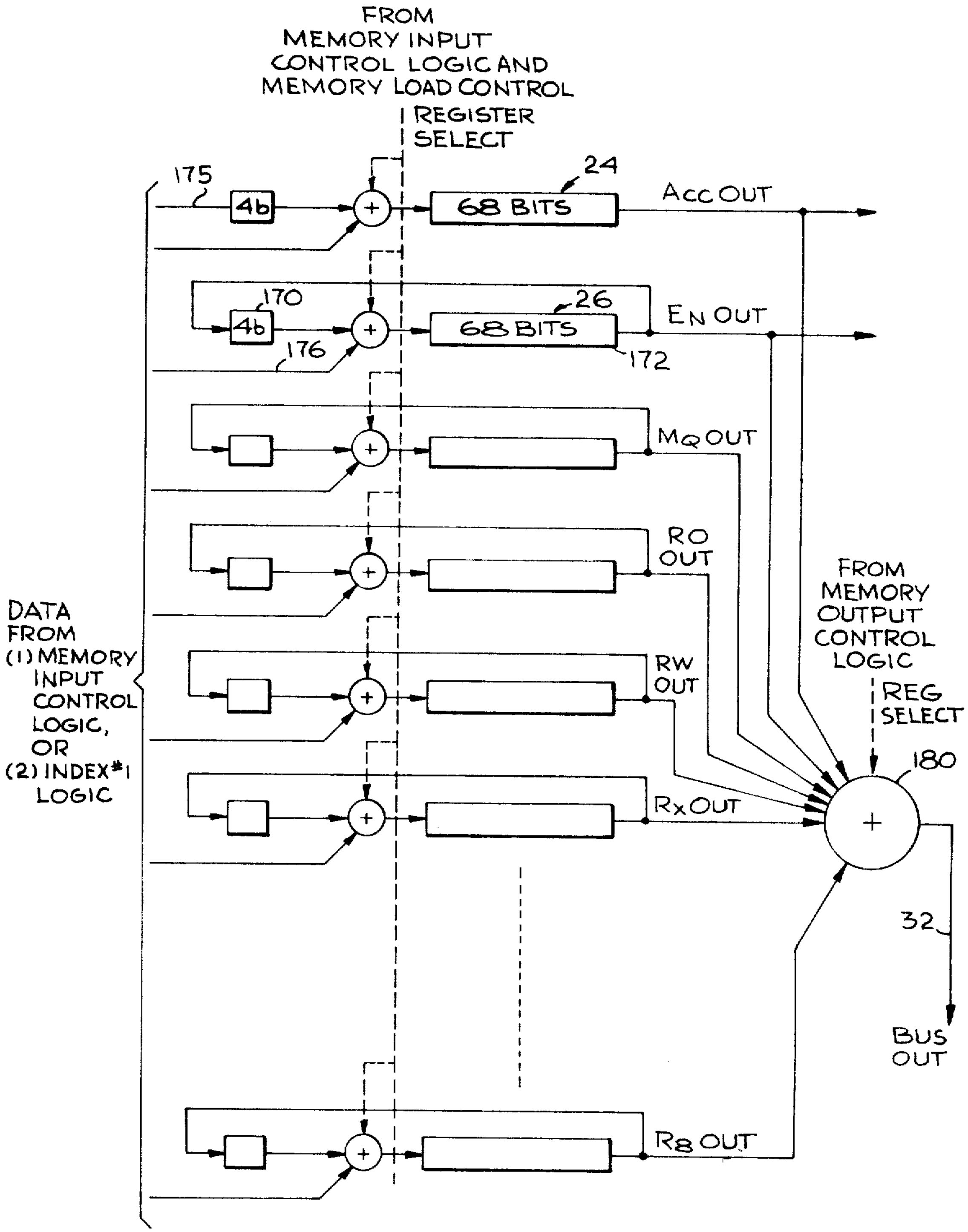
FIG. 7 is a block diagram illustrating the data memory of FIG. 1 in greater detail.

Attention is now called to FIG. 7 which illustrates the organization of the data memory of FIG. 1 in greater detail. Each of the 16 data registers is comprised of 72 bits. As previously indicated, 60 of the 72 bits are utilized to store fifteen binary coded decimal digits and eight of the 72 bits are utilized to store two binary coded decimal digits of an exponent. Two bits are utilized to store the algebraic signs of the mantissa and exponent and two bits are spares.

Each of the registers is split into two separate shift register portions respectively comprised of 4 bits and 68 bits. Considering the entry register 26 as exemplary, note that a 4-bit shift register portion 170 is provided as well as a 68-bit shift register 172. The serial output of the 68-bit portion 172 is coupled back to the serial input of the 4-bit portion 170. The serial output of the portion 170 is coupled to the data input of a gate 174 whose output is connected to the serial input of the 68-bit portion 172. Each of the gates 174 has a second data input 176 to which data can be applied from the memory input control logic, as described in connection with FIG. 5, or from the index-1 logic, to be described in conjunction with FIG. 9. The gates 174 of FIG. 7 are controlled in response to register select information provided on the output terminal 144 of decoder 142 of the memory input control logic of FIG. 5. The gates 174 of FIG. 7 are schematically shown and when unselected by the register select information are intended to couple the serial output terminal of the 4-bit shift register portion 170 to the input of the 68-bit shift register 172. On the other hand, when a gate 174 is selected by the register select information, then the coupling between the portions 170 and 172 is disabled and the data available on the data input terminal 176 is instead entered into the 68-bit portion 172.

As has been previously pointed out, the reason for separating the 72-bit shift registers into two portions is to compensate for a 4-bit delay introduced by the adder 34. This delay occurs as a consequence of the adder requiring all four bits of a binary coded decimal digit in order to perform an operation with respect thereto. By introducing updated data on the data input terminal 176 of a data register, the initial four bits of the register are short-circuited to thus compensate for the four bit delay through the adder. Of course, when the register is not being updated, the serial flow path is through both the 4-bit and 68-bit portions of the register. As has been previously mentioned, the accumulator is arranged to enable the data item therein to be shifted left or right in response to the instructions SHLA and SHRA, respectively. Shift left is accomplished by entering information delayed by four bits into the serial input terminal 175 of the accumulator register 4-bit portion. Shift right is accomplished by entering undelayed information into the gate 174. The entry register contents can similarly be shifted right in response to the SHRE instruction.

The serial outputs of all 16 registers are applied to the data inputs of gate 180 which is controlled by the output of the memory output control logic 36. That is, as has been previously described, the decoder 164 of the memory output control logic of FIG. 6 determines which of the 16 register output terminals is to be coupled to the data output bus 32.

Adder

Attention is now called to FIG. 8 which illustrates the adder 34 of FIG. 1 in greater detail. From what has been said thus far, it will be recalled that the adder is capable of operating in different modes as determined by mode control information delivered to the adder control shift register 140 from the control memory 52. That is, it will be recalled from Table IV that in response to each data modification instruction, a different control word is read from the control memory 52 with each of the control words including as its first three bits an adder operation (OP) code which is shifted through the shift registers of the memory input control logic 30, the memory output control logic 36, and into the shift register 140. The three bits of the operation code enable up to eight different operational modes to be defined. However, in the illustrated embodiment of the invention, only seven of these 3-bit code combinations are utilized with the codes and the corresponding modes being defined as follows:

| OP3 | OP2 | OP1 | MODE |
|---|---|---|---|
| 0 | 0 | 0 | NO OP |
| 0 | 0 | 1 | XF, XC |
| 0 | 1 | 1 | COMPARE |
| 1 | 0 | 0 | ADD |
| 1 | 0 | 1 | ADRP (ADD AND REPEAT) |
| 1 | 1 | 0 | SUBTRACT |
| 1 | 1 | 1 | SBRP (SUBTRACT AND REPEAT) |

The three OP code bits appearing in the shift register 140 are applied to an adder control logic means 200 along with certain other data as illustrated in FIG. 8. The additional data applied to the adder control logic means 200 constitutes the algebraic signs of the two numbers respectively applied to the adder data input terminals (A and B) and also an indication as to whether the number applied to the A input terminal is smaller or larger than the number applied to the B input terminal. This sign and relative magnitude information is required by the adder control logic means 200 in order to properly execute addition and subtraction operations. As will be mentioned again hereinafter, subtraction is executed by the well known technique of nine's complement addition. The adder control logic means 200, in response to the input information applied thereto generates four output control signals respectively labeled A select, OUT select, B select and AIN select. These four output signals are utilized as shown in FIG. 8 to control various gates.

It will be recalled from the explanation of FIG. 1 that the output of the accumulator register 24 as well as the data output bus 32 are applied to the input of the adder 34. This is illustrated in FIG. 8 with the accumulator output being applied on data input terminal 202 of the adder A term select gate 204. Constants +1 and −1 are respectively applied via data input terminals 206 and 208 to the gate 204. The gate 204 is controlled by the A select output terminal of the adder control logic means 200 to couple any of the three data inputs applied to the gate output terminal 210 as the A term.

The B input term to the adder is derived from the B term select gate 212 controlled by the B select output terminal of the adder control logic means 200. The inputs to the gate 212 are derived from the output of the data bus 32 either directly or from a sign inverting circuit (not shown) responsive to a change sign instruction.

The A term, that is, the output of the gate 204 is applied as one data input gate 218 of an AIN select gate 220. Additionally, the output of the gate 210 is applied to the input of a nines complement circuit 222 whose output in turn is applied as a second data input $A^c$ to the input 224 of gate 220. Gate 220 is controlled by the AIN select output terminal of the adder control logic means 200. Thus, the gate 220 can apply either the output of the gate 204 or the nines complement thereof to the input terminal 226 of a summing device 228. The output terminal of the gate 212 is applied to the second input terminal 230 of the summing device 228. The summing device 228 in turn provides a sum output signal on the terminal 232 which is applied as one data input to an output gate 234 controlled by the OUT select output terminal of the adder control logic means 200. A second data input to the gate 234 constitutes the output of gate 204 while a third data input to the gate 234 constitutes the output of the nines complement circuit 222. Thus, the gate 234 can selectively apply any of the following to the adder sum output terminal 238 to constitute the adder sum output signal ADSO: (1) the sum of terms A and B, (2) the term A, (3) the nines complement of the term A. In addition to the adder sum output terminal 238, the adder additionally is provided with an output terminal 240 which yields the output signal ADBO. In order to merely transfer data from one data register to another, the data can be outputted under the control of the memory output control logic means 36 to the data bus 32 and then passed through the gate 212 to the output terminal 240. The memory input control logic means 30 can then direct the data appearing at the terminal 240 to the appropriate register.

It will, of course, be appreciated that the details of the summing device 228 have not been illustrated because suitable serial binary coded decimal adders are known in the art. As a general rule, such adders require the availability of all four binary digits constituting the coded decimal digit before any operation can be fully executed. As a consequence, a 4-bit delay is introduced between the data as it is applied to the gates 204 and 212 and as it is made available at the output terminals 238 and 240. It is for this reason that updated data is introduced into the registers as shown in flG. 7, i.e., short circuiting the first four bits of each register.

The adder of FIG. 7 also includes a compare circuit 250 responsive to the A and B terms appearing respectively on the outputs of gates 204 and 212. If the magnitude of the A term exceeds the magnitude of the B term, the compare means 250 enables output line 252. If the magnitude of the B term exceeds the magnitude of the A term, then output line 254 is enabled. This information is utilized, among other things, by the adder control logic means 200.

In order to better understand the operation of the adder of FIG. 8, attention is now called to Table V which illustrates all of the data modification instructions which cause operation of the adder. Table V illustrates, for each instruction, which data is selected by the A and B select gates 204 and 212 and how the data appearing on the output terminals 238 and 240 are used, as well as the OP codes defined to implement the appropriate selection. Consider, for example, the instruction XCEA which calls for the data in the E register to be exchanged with the data in the accumulator. In order to implement this, the output of the accumulator bypasses the summing device 228 and is made available at the output terminal ADSO delayed by four bits. The output of the entry register is coupled via the data output bus 32 through gate 212 and is thus made available at output terminal ADBO delayed by four bits.

Compiler

It has been previously pointed out that in order to facilitate the user's utilization of the calculator, the calculator is arranged to accept problem statements presented by keyboard actuations in algebraic notation and convert that notation to a Polish notation in order to execute the specified operations. The compiler logic 62 previously discussed is utilized to convert from algebraic notation to Polish notation. Prior to considering the manner in which the compiler logic 62 is implemented, consider the manner in which the following expression is evaluated on the calculator using the steps indicated:

$$y=\sqrt{\frac{(7\times 6)+8}{2}}$$

| Step | a | b | c | d | e | f | g | h | i | | j | |
|---|---|---|---|---|---|---|---|---|---|---|---|---|
| Key | CLEAR X | 7 | x | 6 | + | 8 | ÷ | 2 | = | | √ | |
| E Reg | 0 | 7 | 7 | 6 | 6 | 8 | 8 | 2 | 2 | 25 | 25 | 5 |

(Result)

Note, for example, in steps *c*, *e* and *g* arithmetic instructions are specified by key actuation by the user. However, such arithmetic operations can not be executed when specified by the user because additional information from the keyboard is required prior to the execution. That is, in step b, the operator identifies the multiplier as "7." In step c, the user indicates that the operation is a multiplication operation but it will be noted that the value of the multiplicand has not yet been indicated. In step *d*, the operator does enter the value of the multiplicand and only thereafter can the previously entered multiplication operation be executed. Thus, some means must be provided for enabling the identified operation to be remembered.

All keyboard instructions which require the keyboard designation of two variables will be referred to as arithmetic instructions. The arithmetic instructions, for reasons which will become clear hereinafter, fall into two categories. The AR1 instructions include + and −. The AR2 instructions include X, ÷, $A^x$, $\sqrt[x]{\ }$ The keyboard operations which require the specification of only one variable will be referred to as complex functions (FC). Thus, for example, √, CHG SGN, will be considered complex functions (FC) so far as the compiler logic is concerned. Other keyboard instruction classifications are also necessary to understand the operation of the compiler logic and these will be discussed in conjunction with Table VI to be considered hereinafter. Initially, however, the block diagram implementation of the compiler logic illustrated in FIG. 9 will be considered.

As previously pointed out, the compiler logic is responsive to 6-bit codes generated by the keyboard 60 and indicated in Table I. The compiler logic includes a decoder 260 responsive to the 6-bit keyboard input. The decoder logic 260 controls an arithmetic flip-flop 262 to set the flip-flop in response to arithmetic instructions input from the keyboard. The arithmetic instructions have been previously mentioned and will be discussed in greater detail in conjunction with Table VI. Additionally, the decoder 260 controls control logic means 264 which in turn sets and resets each of eight different flags 266. These flags are respectively identified as EQL, Σ7,Σ 8, XFEA, XFEN, STN, RCN, and EXCN. Additionally, the control logic 264 is responsive to the decoder 260 to provide the following three control signals: STK (Store K Register), STQ (Store Q Register), and XFKO (Transfer from the K to the Operand Register).

In addition to being applied to the decoder 260, the 6-bit keyboard generated codes are also applied in parallel to the input of the K register 268. The K register 268 is an 8-bit shift register which normally recirculates through path 270. The most significant two bits of the K register are permanently set to define a jump instruction. In addition to being coupled back to its input, the output of K register 270 is also applied to the serial input of the 8-bit operation shift register 272. Path 274 recirculates the contents of the operation register. The compiler includes a third register, identified as the Q register 276 which has a recirculation path 278. The serial output from each of the registers 268, 272 and 276 is applied to the data input of the previously mentioned compiler output gate 64. It will be recalled that the program memory bus 72 is also coupled to the gate 64. The output of the gate 64 supplies the instruction register 66. Table VI constitutes a matrix illustrating compiler action responsive to a key depression, shown along the left vertical axis of the matrix, versus a prior key actuation plotted along the horizontal matrix axis. That is, the action of the compiler in response to a key actuation depends upon the key previously actuated as indicated by various flags which might be set and which will be discussed hereinafter. Prior to considering Table VI in detail, it is pointed out that every one of the codes generated from the keyboard 60 is loaded in parallel into the K register 268. In some situations, the code in the K register will then be directly shifted out through the gate 64 to the instruction register. In other situations, it will instead be shifted to the operation register 272. The depression of some keys will cause the contents of the operation register 272 to be shifted out through the gate 64. In other situations, the depression of a key will jam a specific code such as a print code or a numeral entry code generic to all of the numeric keys into the Q register 276. It is pointed out that the compiler supplies the instruction through gate 64 to the instruction register only during the first cycle following a key actuation. At all other times, instructions are provided from program memory 70. The first cycle following a key actuation is indicated by the setting of a flip-flop (not shown) in response to a key strobe signal. The flip-flop is then reset at the end of one full cycle of timing counter 77. Setting of the flip-flop also resets the five most significant bits of the P counter (P6—P10) so that the keyboard caused jump instruction produces a jump to within the initial 64 locations of the program memory.

Table VI will now be considered one line at a time to illustrate the action taken by the compiler in response to the actuation of each of the keys. Line 1 explains the compiler action in response to the depression of the Reset key. Note that regardless of the prior key actuation, the keyboard code generated by the Reset key will be loaded into the K register 268 and shifted out through the gate 64 to the instruction register.

Line 2 explains the operation in response to the actuation of the = key. If the prior actuated key was any of those indicated, the contents of the operation register 272 will be unloaded through the gate 64 to the instruction register. Thus, for example, if an AR1 (e.g. +) operation had been previously specified, the + code which would have previously been stored in the operation register 272 would be outputted to the instruction register in response to the actuation of the = key.

Figure 9:
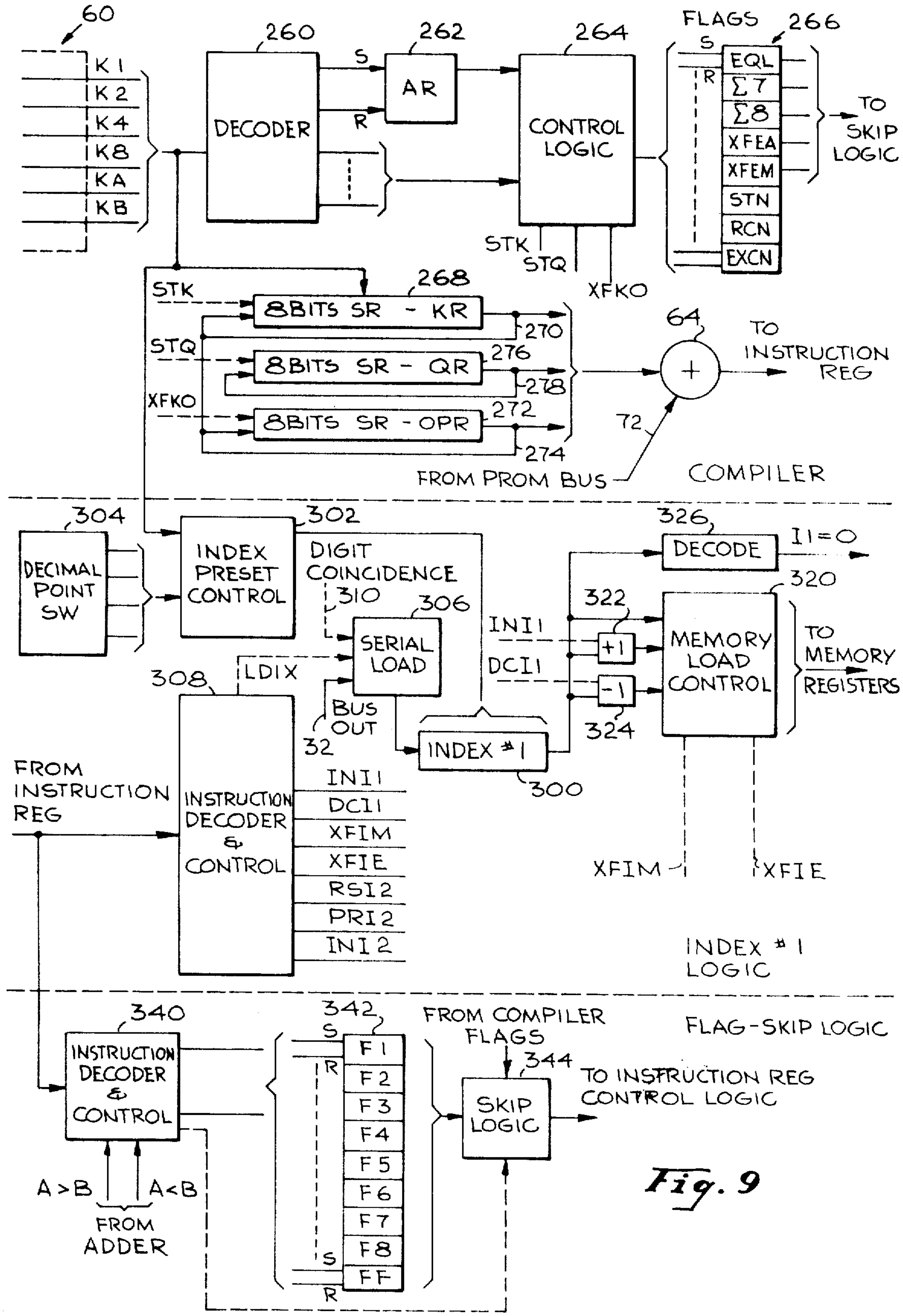
FIG. 9 is a block diagram illustrating the compiler, index, and flag-skip logic of FIG. 1 in greater detail.

Note that actuation of the = key also sets the ERL flag 266 (FIG. 9).

Lines 3 and 4 explain the compiler action in response to the actuation of the Σ7 and Σ8 keys. As should be appreciated, the compiler action is essentially the same as in response to the = keys except however, the Σ7 flag and Σ8 flag are set respectively.

Line 5 explains the compiler action in response to the actuation of any one of the AR1 keys which, as previously pointed out, constitutes the + and − keys. As shown, if the flags indicate that the previously actuated key was =, Σ7 or Σ8, then a print code (PQ) is loaded by the control logic 264 into the Q register and shifted out through gate 64. This causes the previously entered digit to be printed. In addition, the arithmetic flip-flop 262 is set as well as the XFEA flag shown in FIG. 9. Additionally, the control logic 264 generates the XFKO control signal to cause the keyboard code representing the particular AR1 operation to be transferred to the operation register 272.

If, on the other hand, an AR1 key is actuated after another AR1 key, an AR2 key, or an FC (complex function) key, then the contents of the operation register 272 are shifted out through the gate 64. In order to better appreciate this, consider the problem 72+23+48. The sequence of key actuations is as follows:

| STEP | a | b | c | d | e | f | g | h | i |
|---|---|---|---|---|---|---|---|---|---|
| clear | X | 7 | 2 | + | 2 | 3 | + | 4 | 8 |

When the + key in step *d* is actuated, of course no addition operation can occur. The operation must wait until all of the digits of the next number have been entered. Internally, the calculator will not know when all of the digits of the next number have been entered until a subsequent operation is called for. Thus, steps *e* and *f* are merely numeric entries and it is only when step *g* occurs, i.e., the depression of the + key, that the + code from step *d*, still stored in the operation register 272, is shifted out through the gate 64.

Still considering line 5 of Table VI, in addition to the contents of the operation register 272 being shifted out through gate 64, the arithmetic flip-flop 262 is set as well as the XFEA flag. Additionally, the new + code is shifted from the K register to the operation register 272.

Line 6 of Table VI indicates the compiler action in response to the depression of one of the AR2 keys. The AR2 keys include the following:

$$x, \div, a^x, \sqrt{\ }$$

If an AR2 key is actuated after any one of the =, Σ7 or Σ8 keys, then a print code (PQ) is loaded into the K register and shifted out through the gate 64 to cause the printing of the previously entered digit. Additionally, the arithmetic flip-flop 262 is set as well as the XFEN flag. Additionally, the code entered into the K register is shifted to the operation register 272. If the AR2 key is depressed after an AR1 key, an AR2 key or an FC key, then the contents of the operation register 272 are shifted out through the gate 64 for the reasons which were previously discussed with respect to the AR1 keys. The arithmetic flip-flop is set as well as the XFEN flag and the new AR2 code is transferred from the K register to the operation register.

Line 7 of Table VI describes the compiler action in response to the actuation of a complex function (FC) key. Regardless of the previously actuated key, the key code associated with that complex function key is shifted immediately from the K register through the gate 64 to the instruction register.

Line 8 explains the compiler action with respect to actuation of a DE1 (data entry first type) key. The DE1keys are any of the numeric keys. If a DE1 key is actuated after a STN key, an RCN key, or an XCN key, then the numeric code provided by the keyboard is interpreted as the identification of a data memory register and is thus immediately transferred from the K register through the gate 64. On the other hand, if a numeric key is actuated after actuation of any of the other keys, it is interpreted merely as a numeric entry and causes a generic numeric entry key code (KQ) to be loaded into the K register 276 and shifted out through the gate 64. That is from a control stand point it makes no difference which numeric digit is being entered and thus regardless of which numeric key is actuated, a generic numeric code KQ will be shifted out of the Q register.

Lines 9, 10 and 14 respectively relate to the actuation of the DE2 (data entry second type) key, print key, or the RC0, F2 key. In any of these cases, the associated codes are immediately shifted out through the KR register.

Lines 11, 12 and 13 of Table VI relate to the store N (STN), recall N, (RCN) and Exchange N(XCN) key actuations. Actuation of any of these keys does not cause any operation other than to set the appropriate flag. When the subsequent numeric or DE1 key is actuated, appropriate control information will be outputted through gate 64.

With continuing reference to FIG. 9, attention is now directed primarily toward the portion thereof labeled Index 01 logic. The index 01 logic is the general all-purpose 4-bit delay register which is normally used for data inputting, data operating and for the formation and intermediate storage of multipliers and quotients. As such, the index 01 register 300 can be loaded from the keyboard via the index preset control logic 302. When loaded from the keyboard, bits 1, 2, 4 and 8 of the keyboard code are loaded into the index 01 register. Additionally, the index 01 register may, under program control, be loaded with the 4-bit contents of the decimal point switch 304 which is available to the user and which can be used to define the position of a decimal point anywhere within the 15 positions of the mantissa. Still further, the index 01 register can be loaded from the memory via the data output bus 32 as a consequence of the execution of one of the load index instructions.

More particularly, it will be recalled that the output of any register including the accumulator, entry, and MQ registers can be applied to the data output bus 32. As a consequence, any BCD digit from any one of the data registers can be loaded into the index 01 register. Note that the bus 32 is coupled to the index 01 register through a memory serial load gate 306. The data input to the gate 306 is taken from the data bus 32. A control input labeled LDIX controls the serial load circuit 306 in response to a load index (LDIX) instruction appearing in the instruction register 66. The contents of the instruction register are decoded by an instruction decoder and control means 308. In addition to the data bus input and the LDIX control input to the serial load gate 306, a timing input 310 is provided to enable the selection of a single digit for entry into the index 01 register. The timing input is responsive to the occurrence of the digit coincidence signal mentioned in conjunction with the discussion of FIG. 3(*a*).

The output of the index 01 register is applied to a memory load control gate 320 which is responsive to either of only two instructions, i.e., XFIM (Transfer index to MQ register) and XFIE (Transfer index to Entry register). These two instructions are also decoded by the decoder means 308. The data output of the memory load control gate 320 is logically ORed with the data output of the memory input control logic 30 discussed in connection with FIG. 5 with the logically ORed output being applied to the register updating inputs as depicted in FIG. 7.

In addition to merely being able to load the contents of the index 01 register into the MQ or entry registers, means are provided for incrementing or decrementing the contents of the index 01 register prior to transfer to the MQ or entry registers. More particularly, an "add 1" circuit 322 is provided between the serial output of the index 01 register 300 and one data input of the memory load control gate 320. Similarly, a "-subtract 1" circuit 324 is provided between the output of the index 01 register 300 and one data input to the control gate 320. The circuits 322 and 324 are respectively enabled in response to the INI1 (Increment Index 01 register) and the DCI1 (Decrement Index 01 register) instructions appearing in the instruction register 66. The decoder means 308 decodes the contents of the instruction register to recognize these instructions to control the add and subtract circuits 322 and 324.

In addition to the foregoing, a special decoder 326 is provided for the purpose of sensing when the contents of the index 01 register is equal to zero. This decoder 326 is useful, for example, in a situation where a certain number of iterations or repetitions are desired and the index 01 register is utilized in conjunction with the decrement circuit 324 to step the count in the index 01 register down from the desired number to zero.

With continuing reference to FIG. 9, attention is now called to the portion thereof labeled "Flag-Skip Logic." This portion of the logic includes an instruction decoder and control means 340 which is also responsive to the contents of the instruction register 66. In response to any of the control instructions calling for the setting or resetting of flags FL1--FL8 and FLF, the control logic 340 causes the appropriate flag flip-flop 342 to be set or reset. Table VII describes the function of each of the flags and indicates the instructions in response to which it is set, and in response to which it is reset. Table VII also indicates the internal instructions which cause the program counter to skip if the flag is set. Thus, for example, if the SKF1 instruction appears in the instruction register 66, then if the flag FL1 is set, the skip logic 344 will cause the program counter to skip, as has been described in conjunction with FIG. 4. The skip logic 344 is responsive both to the flags 342 which are set under program control and some of the flags 266 set in response to keyboard action.

Figure 10:
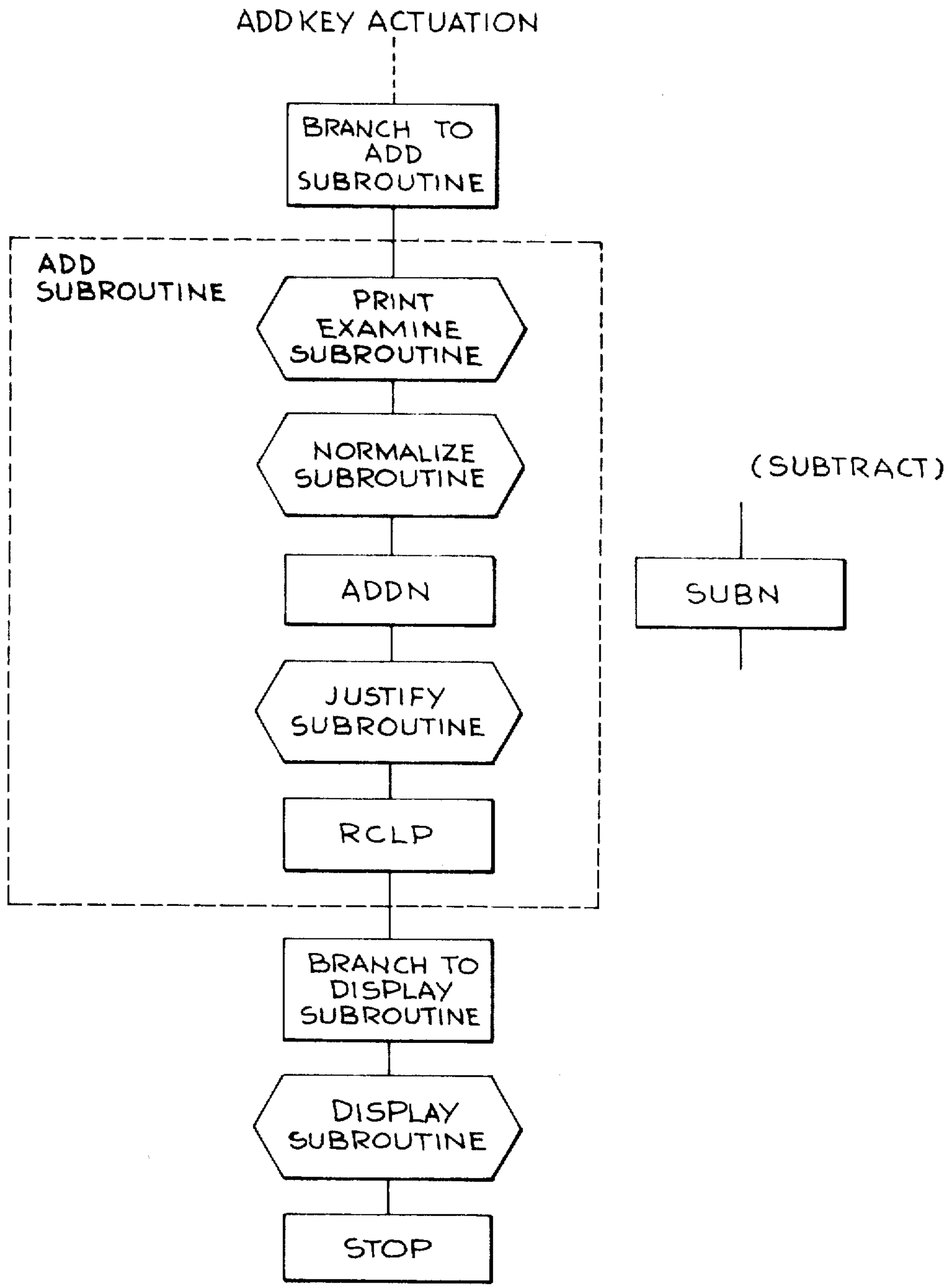
FIG. 10 is a flowchart depicting the execution of a key ADD operation.
Figure 11:
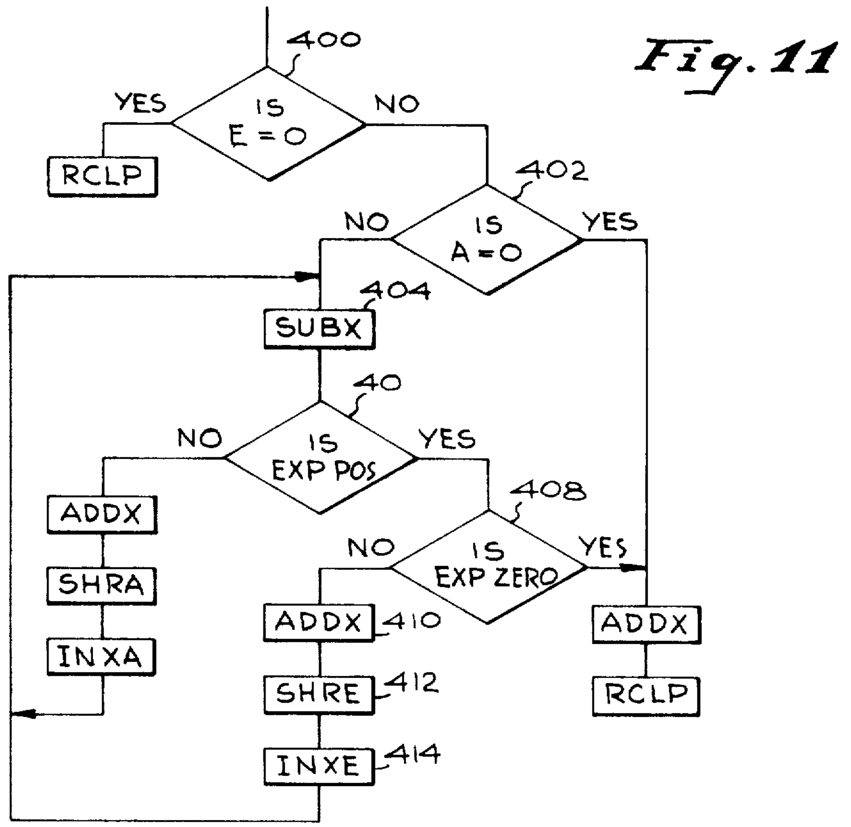
FIGS. 11 and 12 are flowcharts respectively depicting execution of normalize and justify subroutines utilized in the key ADD operation of FIG. 10.
Figure 12:
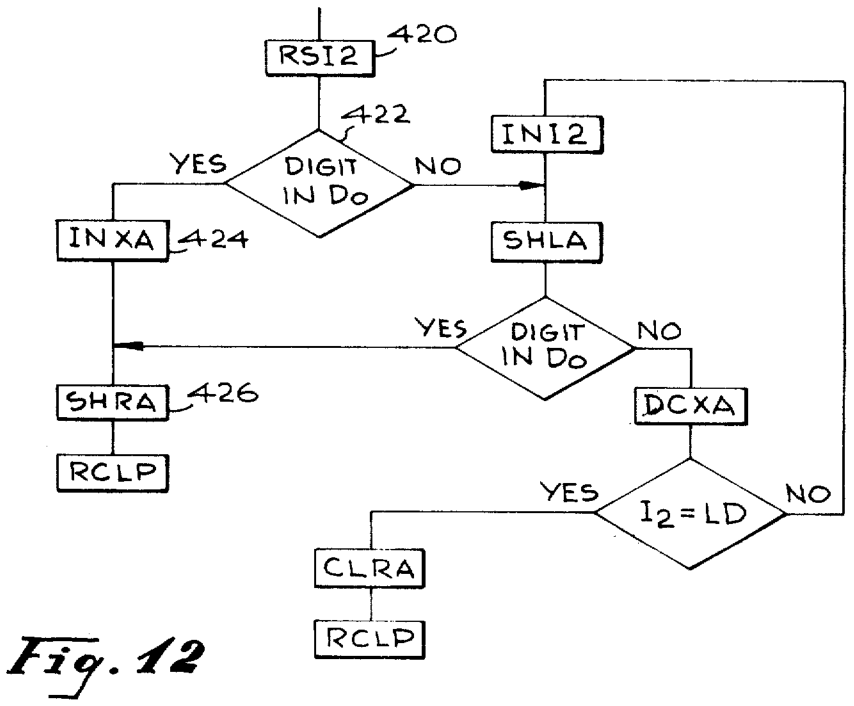

From what has been said thus far, it is expected that the implementation and the operation of the calculator apparatus of FIG. 1 will now readily be understood. However, in order to further clarify the operation, reference will hereinafter be made to Tables VIII and IX and to FIGS. 10, 11 and 12. In combination, these tables and figures demonstrate in detail the internal machine operation occurring as a consequence of the actuation of the + key. Table VIII illustrates the sequence of internal instructions contained within a portion of the program read-only memory 70. FIG. 10 is a flow diagram of the key ADD operation illustrating generally the subroutines which are executed in response to the actuation of the + key. FIGS. 11 and 12 constitute flow diagrams representing the execution of two of the subroutines indicated in FIG. 10. Table IX illustrates the sequence of internal instructions which appear in the instruction register 66 in the course of executing the add subroutine. Additionally, Table IX describes the effect of each of the internal level instructions appearing in the instruction register. For convenience, from a programming standpoint, the program read-only memory 70 will be considered as being comprised of 32 columns (column 00 to column 31), each column being comprised of 64 lines (line 00 to line 63). Each line corresponds to a physical location in the program read-only memory. Thus, the program counter 74 is able to address any one of the program memory locations and access the program line comprising one of the internal instructions therefrom. Table IX illustrates the preferred program embodiment contained within the first four columns of the 32 columns of the program memory 70. From what has been previously said, it should be recalled that the program memory stores a plurality of subroutines, each subroutine being comprised of a sequence of internal instructions. For example, note that the instructions constituting the ADD subroutine are contained within lines 16—31 of column 02. Similarly, column 03 contains the instructions of the multiplication subroutine in lines 00—15. As will be discussed hereinafter in conjunction with FIG. 10, the actuation of a keyboard operation key causes the execution of a sequence of subroutines and thus, for example, the actuation of the + key represented in FIG. 10 will cause the execution of several subroutines comprised of many internal instructions in addition to the execution of the ADDN (add numeric) instruction. That is, prior to executing the add numeric instructions, it may, for example, be necessary to normalize the numbers stored in the entry and accumulator registers. It will be recalled that the numbers are stored as a mantissa and an exponent. As will be seen, in order to add two numbers, it is necessary to first normalize, i.e., to align the numbers with respect to a decimal point position.

It has been previously pointed out that a branch instruction enables the program counter to branch to one of 64 different program memory addresses. These addresses constitute the 64 lines of column 00 illustrated in Table VIII. It will be noted that most of these instructions within column 00 constitute branch instructions which will cause the program counter to branch to some subsequent memory address identified by the branch instruction. This subsequent program memory address will contain the first instruction of a subroutine. For example, note that line 32 of column 00 contains the instruction BR 02,16. Next to this instruction in Table VIII, the word "ADD" is contained in parenthesis. This indicates that this branch instruction will cause a branch to the add subroutine whose starting address is contained in line 16 of column 02. When the instruction in line 16 of column 02 is accessed, it will be noted that it itself constitutes a branch instruction. Thus, the program counter will store the program count plus one (i.e., column 02, line 17) and branch to column 4, line 48. As will be mentioned hereinafter, the instruction stored in column 4, line 48 constitutes the starting address of a print examine subroutine. As with most subroutines, when the subroutine is completed, an RCLP (recall program count) instruction is accessed to recall the last program count from the program counter store memory 80. Thus, after the print examine subroutine, the program counter will return to column 02, line 17.

In order to demonstrate the manner in which the instructions are accessed from the program memory 70, consider that a user desires to add the following two numbers:

9972.1+85.82

In order to pose this problem to the calculator, the user will actuate the following sequence of keys:

| STEP | a | b | c | d | e | f | g | h | i | j | k | l | m | n |
|---|---|---|---|---|---|---|---|---|---|---|---|---|---|---|
| KEY | CLEAR X | 9 | 9 | 7 | 2 | · | 1 | + | 8 | 5 | · | 8 | 2 | = |

As a consequence of the foregoing key actuations, prior to the actuation of the = key in step *n*, the accumulator register will store the mantissa 9.9721 and the exponent 03. The entry register will store the mantissa 8.582 and the exponent 01. On the depression of the = key after the + key, the compiler logic 62 will present a branch instruction to the instruction register 66 causing the P counter to identify column 00, line 32 (step 1, of Table IX).

Before considering the sequence of internal instructions accessed from thenceforth, attention is called to FIG. 10 which illustrates the flow diagram of the sequence of subroutines executed in response to the actuation of the + key. First, a branch to the add subroutine occurs and a print examine subroutine is then executed. The print examine subroutine will not be considered in detail but suffice it to say it causes the contents of the E register to be printed. Upon termination of the print examine subroutine, a normalized subroutine will be executed which, as previously noted, shifts the numbers in the entry and accumulator registers relative to one another to align them with respect to a decimal point position. Once the normalize subroutine has been executed, then the add numeric internal instruction will be executed to add the numbers in the entry and accumulator registers. Thereafter, a justify subroutine has to be executed to determine the proper exponent. Upon completion of the justify subroutine, the recall P internal instruction is executed to recall the last stored program count from the program counterstore. This completes the add subroutine and thereafter a branch may occur to a display subroutine prior to the calculator coming to a stop to await further inputs.

The flow charts of the normalize and justify subroutines will now be considered in conjunction with the discussion of Table IX illustrating and explaining the sequence of internal instructions accessed from the program memory. The top most portion of Table IX indicates the manner in which the two numbers to be added are stored in the entry and accumulator registers. Note that only the most significant digit of each of the mantissa's is stored to the left of the assumed decimal point position. The value of the exponent stored in each of the registers indicates the order of the stored number.

It has been pointed out that actuation of the = key after the + key causes the compiler to preset the program counter 74 to the count column 0, line 32. This count accesses the (Table IX, step 2) branch instruction 02,16 which identifies the key add routine. Branch instruction 04,48 is accessed from column 2, line 16 and, as previously noted, causes the execution of a print examine subroutine which causes the contents of the E register to be printed. Details of this subroutine are not illustrated. However, it is pointed out that the print examine subroutine terminates in an RCLP (recall program counterstore) instruction, which returns the program counter to column 2, line 17 causing the branch instruction BR02, 00 to be accessed. This causes the program counter to branch to column 02, line 00 and as a consequence, the instruction SFE0 is entered into the instruction register (step 4). This instruction sets flag 1 if the contents of the E register is 0. Since, in the assumed example, the contents of the E register is not 0, the flag is therefore not set. The program counter then increments by one to next access the instruction SKF1 (step 5) which causes a skip if the flag 1 is set. Since the flag 1 has not been set no skip occurs and the program counter advances to column 2, line 2 (step 6) to cause the JU04 instruction to be entered into the instruction register. This instruction causes the program counter to jump to line 4 of the same column causing instruction SFNZ to be accessed which sets flag 1 if the accumulator is not equal to 0. Since the accumulator in the assumed example is not equal to zero, the flag 1 is set. The program counter then increments to access SKF1 (step 8) which causes a skip if flag 1 is set, and since the flag 1 has been set, a skip occurs to column 02, line 7. The sequence of instructions thus far discussed can be followed in the flow chart of FIG. 11. That is, the first decision 400 illustrated therein is "Is the entry register equal to zero?" Since the answer is negative, the next decision 402 is considered "Is the accumulator equal to zero?" Since the answer is no, we proceed to the instruction SUBX (subtract exponents) represented by the block 404 in FIG. 11. Returning to Table IX, this instruction SUBX is accessed (step 9) from column 2, line 7 and causes the subtraction of the exponent in the E register from the exponent in the A register, thus leaving the contents in the E and A registers as indicated in Table IX. The program counter then increments to column 2, line 8, to access the SKXP instruction causing a skip if the exponent in the accumulator register is positive. Since the accumulator exponent is positive, the program counter skips to column 2, line 10 to access the SKX0 instruction which causes a skip if the accumulator exponent is zero. Since the accumulator exponent is not zero, no skip occurs and the program counter increments to column 2, line 11 to access the instruction JU25 causing a jump to column 02, line 25 (step 13). The instruction accessed from lines 8, 10 and 11 of column 2 are represented by the path through decision blocks 406 and 408 of the flow chart of FIG. 11.

With the program counter defining column 2, line 25, the instruction ADDX (add exponents) is accessed to add the exponent in the E register to the exponent in the A register to effectively restore the contents of the E and A registers to their original state as indicated. The program counter is then incremented to column 2, line 26 to access the instruction SHRE which causes the entry register to shift right to set up the E and A registers as illustrated in Table IX after step 14. The program counter is then incremented to column 2, line 27 to access the instruction INXE to increment the E register exponent to thus cause the E and A registers to be configured as illustrated after step 15 of Table IX. The program counter is then incremented to line 28 to access the instruction JU07 to cause the program counter to jump to line 7. The sequence between lines 25 and 28 of column 2 is represented by the instruction blocks 410, 412 and 414 in the flow chart of FIG. 11. It should be appreciated that in looping once around the loop comprised of the blocks 404, 408, 410, 412 and 414, that the exponents in the E and A registers have been compared and have been modified tending toward equalization by causing a shift right in the entry register. The same loop is again repeated (step 17—24) as shown in Table IX to again shift the contents of the E register one digit to the right and increment its exponents to thus equalize the E and A register exponents at 03. The program counter then again jumps out of block 414 in FIG. 11 to column 2, line 7 (step 25) to again access the instruction SUBX to subtract the E register exponent from the A register exponent. As indicated, this reduces the A register exponent to zero. The program counter is incremented to column 2, line 8 to access the instruction SKXP to determine whether the exponent in the A register is positive (0 or positive) and determine that it is, the program counter skips to column 2, line 10 (step 27) to access the SKX0 instruction to skip if the accumulator exponent is zero. On this loop it is zero and as a consequence the program exits from the decision block 408 in the affirmative direction rather than in the negative direction on the previous loops. For the first time the instruction in column 2, line 12 (step 28) ADDX is read to restore the accumulator exponent and to configure the E and A registers as indicated. The program counter then increments to column 2, line 13 which constitutes the instruction RCLP to recall the last stored program count from the program counter store 80. This completes the normalize subroutine and loads the address corresponding to column 2, line 18 (step 30) into the program counter. This accesses the instruction ADDN which causes the mantissa of the E register to be added to the mantissa in the A register with the sum being stored in the A register thus causing the E and A registers to be configured as shown after step 30 in Table IX. The program counter is then incremented to column 2, line 19 which causes a branch to column 1, line 16 which, it will be noted, constitutes the starting address of the justify subroutine.

Column 1, line 16 (step 32) defines the instruction RSI2 which causes the index 02 register to be reset. The program counter is incremented to column 1, line 17 which accesses the SKDO instruction causing a skip if there is a digit in the D0 position (i.e., 2-digit positions to the left of the decimal point) of the A register. Since in the assumed example, there is a one in the D0 position, the program counter is caused to skip to column 1, line 19 (step 34) to access the INXA instruction to increment the A register exponent. This configures the E and A registers as shown after step 34 in Table IX. It will, of course be recognized that a shift right is then required. This is caused to come about by the program counter incrementing to column 1, line 20 which accesses the instruction JU28 causing a jump to column 1, line 28. This accesses the instruction SHRA which shifts the contents of the accumulator one digit to the right. The instructions thus far discussed forming part of the justify subroutine can be followed in the flow chart of FIG. 12. That is, initially, the instruction block 420 is executed to reach the decision block 422. The decision block 422 effectively determines whether a shift right or a shift left is required. If a digit does exist in the position two digits to the left of the decimal point, as in the assumed example, then the question in decision block 422 is answered in the affirmative to cause the instruction INXA in the block 424 to be executed. This in turn causes the subsequent execution of the SHRA instruction in block 426 as has been described.

The program counter is then incremented to column 1, line 29 to access the RCLP instruction to recall the last stored address from the program counter store 80. This completes the justify subroutine and returns the program counter to the last stored address constituting column 2, line 20 (step 38). This in turn accesses an RCLP instruction to then recall the next address from the program counterstore 80 which is column 00, line 33. This second RCLP instruction terminates the Add subroutine. Thereafter, another branch will occur to display or print the contents of the entry register, to execute a switch examine subroutine, etc.

Lean Mode Programmer

Figure 13:
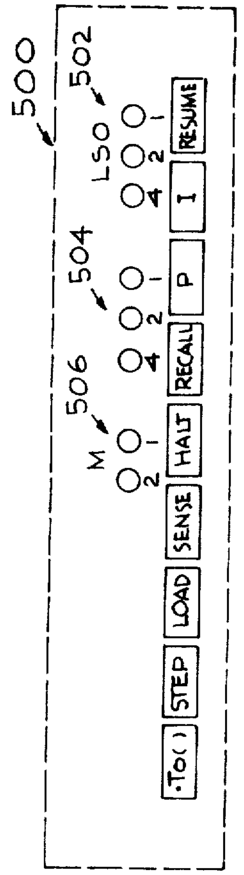
FIG. 13 is a diagram of a learn mode programmer keyboard which can optionally be incorporated with the keyboard of FIG. 2.
Figure 14:
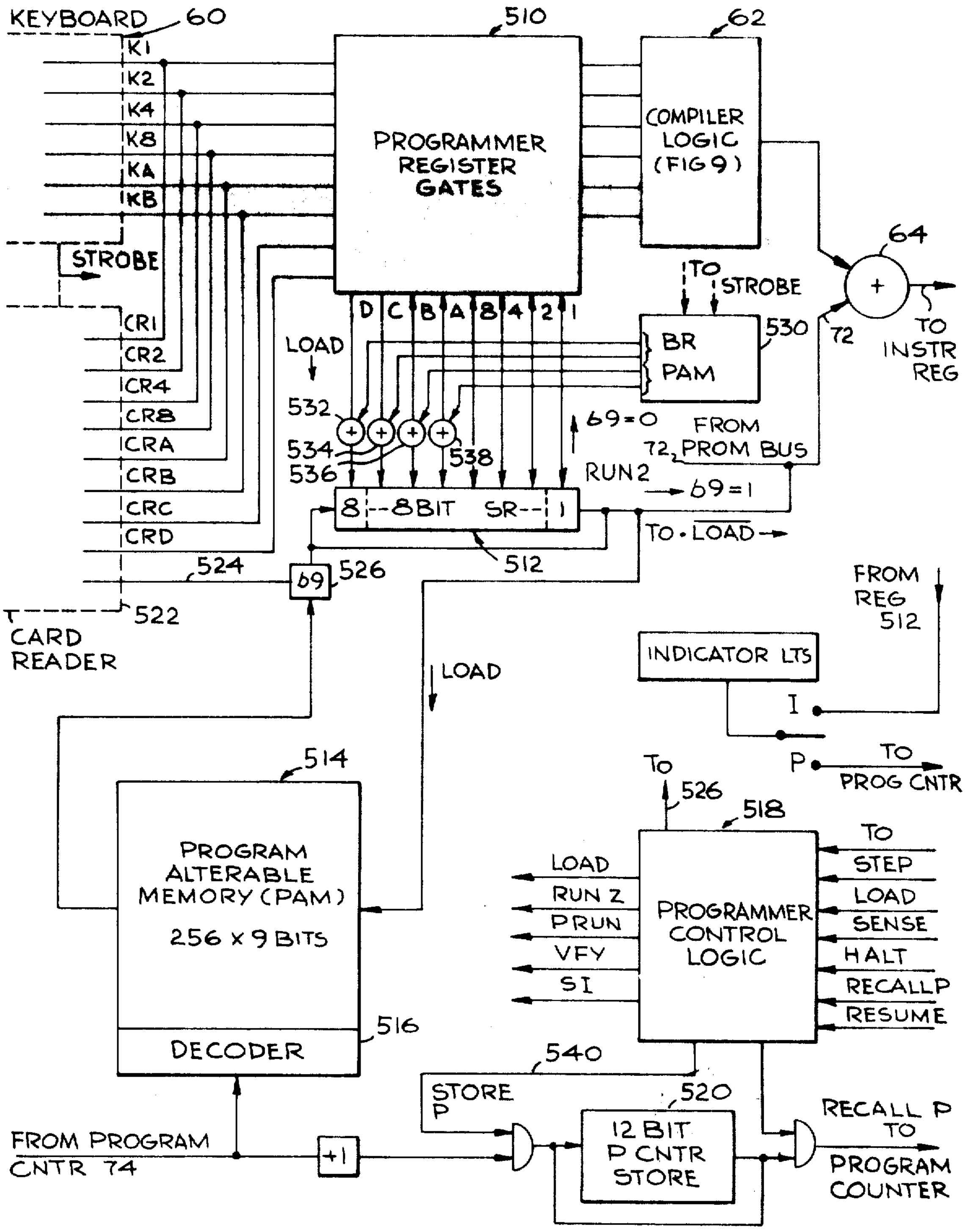
FIG. 14 is a block diagram illustrating the manner in which the calculator apparatus of FIG. 1 is modified to incorporate the learn mode programmer.

Attention is now called to FIGS. 13 and 14 which respectively illustrate how the keyboard of FIG. 2 and the block diagram of FIG. 1 can be modified to incorporate a learn mode programmer into the calculator apparatus already described. Briefly, the learn mode programmer embodies an alterable program memory (PAM) which, in all substantial respects, acts as if it were part of the previously discussed program read only memory 70. That is, as will be seen hereinafter, the alterable portion of the program memory is addressed from the program counter 74 in the same manner as the read-only portion of the program memory 70. Additionally, information accessed from the alterable portion of the program memory is channeled to the instruction register 66 which treats the information appearing therein the same regardless of whether it emanated from the alterable or read-only portion of the program memory. As will be discussed in greater detail hereinafter, the alterable portion of the program memory is utilized to store a program which can be loaded therein either from the keyboard or from a storage medium, such as punched cards, via a card reader. When loaded exclusively from the keyboard, the program stored by the alterable portion of the program memory will be comprised mostly of keyboard level instructions. It may include any of the keyboard instructions plus a few selected machine instructions such as branch, halt, Recall P, etc. However, when loaded from the card reader, the stored program can consist of both keyboard level and any internal level instructions. As mentioned, the alterable portion of the program memory is addressed by the common program counter 74. Keyboard level instructions accessed from the alterable program memory portion are treated just as if they were coming directly from the keyboard in that they are channeled through the previously discussed compiler logic of FIG. 9 prior to producing an instruction in the instruction register. On the other hand, internal level instructions accessed from the alterable portion of the program memory are treated the same as if they were coming from the program read-only memory via bus 72.

Attention is now called to FIG. 13 which illustrates what will be referred to as the learn mode programmer keyboard 500. It is to be understood that the keyboard 500 is to be utilized in conjunction with the keyboard of FIG. 2 when the optional learn mode programmer is incorporated in the previously described calculator apparatus of FIGS. 1—9. The keyboard 500 is comprised of nine pushbutton switches and eight indicator lights. The switches are identified as follows:

TO( ), STEP, LOAD, SENSE, HALT, RECALL P, P, I, RESUME.

The eight indicator lights are arranged in three groups for representing three octal digits. Thus, a least significant octal digit is represented by the three indicator lights of group 502, an intermediate significant digit is represented by the three lights of group 504, and a most significant digit is represented by the two indicator lights of group 506.

Appendix Table X lists the switches and indicators and describes their functions. Additionally, Table X indicates the pushbutton action for each of the switches. The switches labeled "latch" are intended to be of the push to latch, push to release type. Two exceptions are the latches labeled P and I. These operate as a rocker pair. That is, only one of the P and I switches can be latched at any one time. Latching either one releases the other.

Prior to considering the structure of FIG. 14 in detail, the function of each of the switches of keyboard 500 will be briefly discussed. The TO( ) switch is used for two purposes. When not in the learn or load mode (learn and load are used synonymously) (as represented by the position of the LOAD switch), pressing of the TO( ) switch followed by the depression of one of the data entry keys of the keyboard of FIG. 2, causes the program counter 74 to branch to a count dictated by the four least significant digits of the code generated by the data entry key. In other words, when not in the learn mode, pressing the TO( ) key followed by the depression of a particular one of the data entry keys will immediately cause the program counter 74 to branch to a count defining one of 16 possible branch locations in the alterable program memory (PAM). However, when in the load mode (as indicated by the LOAD switch being engaged) depression of the TO( ) key followed by the depression of one of the data entry keys will cause a branch instruction to be stored in the alterable portion of the program memory, hereinafter referred to as the PAM.

When in the load mode, actuation of the HALT and RECALL P switches will enable a user to store the corresponding internal level instruction codes in the PAM. It will be recalled that in the previously discussed calculator apparatus illustrated in FIGS. 1—9, the halt and recall P instructions were internal to the calculator and were not available to a user. The functions of the RESUME, STEP and SENSE keys are adequately described in Table X. The P and I keys are used to respectively couple the program counter 74 and 8-bit programmer register 512 to the indicator lights on keyboard 500 to enable a user to see the contents of these two registers. It will be recognized that register 512 stores the same instruction information as will subsequently appear in instruction register 66. This is particularly useful when a user desires to examine a program stored in the PAM.

Attention is now called to FIG. 14 which illustrates the apparatus to be incorporated into the calculator apparatus depicted in FIGS. 1—9 in order to incorporate the learn mode capability. The learn mode apparatus of FIG. 14 includes the following major portions: A set of programmer register gates 510 is incorporated between the previously discussed keyboard 60 and compiler logic 62. The programmer register gates 510 have eight parallel output lines which are coupled to an 8-bit programmer shift register 512. Six parallel output lines from the shift register 512 are connected to the input of gates 510. The serial output of the shift register 512 is coupled to the serial input of the program alterable memory (PAM) 514. For simplicity, the PAM may be considered as being comprised of 256 9-bit shift registers, each shift register being capable of storing an 8-bit instruction code plus a 9th bit, to be discussed hereinafter which defines whether that instruction is a keyboard level or internal level instruction. The PAM 514 includes a decoder 516 which is responsive to the count defined by the previously discussed program counter 74. Additionally, the learn mode programmer of FIG. 14 includes a block of control logic 518 which is responsive to the condition of various ones of the switches on keyboard 500 to produce various control signals as indicated. In addition to the foregoing, a 12-bit program counterstore 520 is provided for storing a program count. The 12-bit program counterstore 520 is used in addition to the previously discussed LIFO program counterstore 80 of FIGS. 1 and 4. More particularly, whereas the program counterstore 80 is used to store program counts in the event of an internal BRANCH instruction, the store 520 is used to store a program count primarily in the event of a keyboard instruction accessed from the PAM. As will be seen, the HALT instruction is utilized to, for example, enable a user to input a variable via the keyboard in the course of a stored program being executed. In order to accept this input, the program counter 74 must branch to various subroutines but it is then necessary of course, for the program counter to return to the instruction within the PAM following the HALT instruction in order to continue execution of the stored program. The program counter 74 is returned to the PAM location following the HALT instruction by recalling the count from store 520. In the case of a keyboard instruction accessed from the PAM, the store 520 acts as an extension of the LIFO store 80 to retain the address of the next instruction to be retrieved from PAM. This is necessary because a keyboard instruction always produces a jump instruction in the instruction register 66 which does not store the next P count.

FIG. 14 illustrates keyboard 60 with the 6 output terminals thereof respectively labeled K1, K2, K4, K8, KA, and KB, as in FIG. 9. As previously discussed, in response to the actuation of any of the keys of the keyboard of FIG. 2, a 6-bit code is generated which, as shown in FIG. 9, passes through compiler logic prior to an appropriate jump instruction being loaded into the instruction register 66. In FIG. 14, the keyboard 60 output terminals are coupled to the programmer register gates 510. In the event that an instruction is neither being loaded into nor being executed from the PAM 514, the programmer register gates 510 act just as if they were not there. That is, the programmer register gates 510 will enable the connections between the keyboard and compiler exactly as is shown in FIG. 9. However, in the event a program is being loaded into the PAM 514 or being executed therefrom, the programmer register gates 510 will suitably direct information along other paths.

Figure 15:
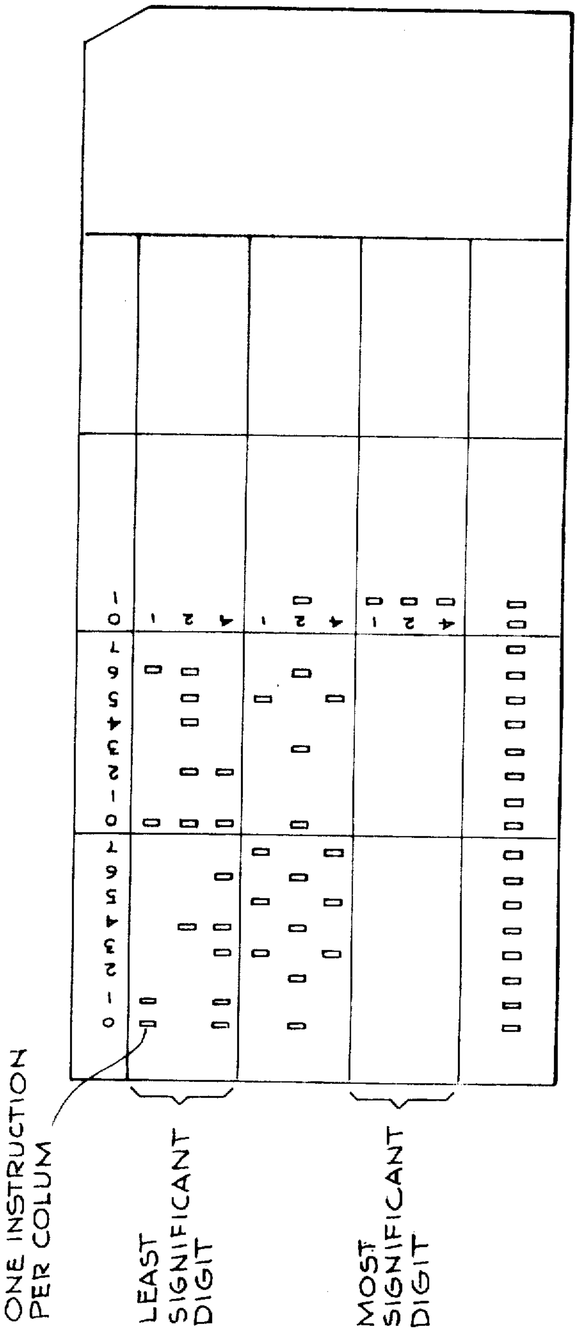
FIG. 15 is a diagram of a punched card encoded to execute the program of Table X.

As previously mentioned, in order to load instructions into the PAM 514, a card reader 522 is provided for reading punched cards (as shown in FIG. 15) which may contain a sequence of both keyboard and internal level instructions. The card reader 522 is provided with nine output terminals. The first eight of these terminals are respectively labeled CR1, CR2, CR4, CR8, CRA, CRB, CRC and CRD. These eight terminals are utilized to carry the eight bits of internal level instructions stored on the card. Where 6-bit keyboard level instructions are stored on the card, bits C and D have no meaning. The card reader 522 has, in addition, a ninth output terminal 524 which carries a bit indicating whether the instruction associated therewith is a 6-bit keyboard level instruction or an 8-bit internal level instruction.

Card reader output terminals CR1, CR2, CR4, CR8, CRA and CRB are wire ORed with the corresponding keyboard output terminals and applied to the programmer register gates 510. Card reader output terminal CRC and CRD are also applied to the register gates 510. Card reader output terminal 524 is coupled to a *b9* flip-flop 526 which can be considered as the ninth bit of the shift register 512.

In order to load a program from the keyboard 60 into the PAM 514, the LOAD and STEP switches must initially be disengaged (run-continuous mode) and the user will actuate the TO( ) key thereby setting a TO flip-flop within the programmer control logic 518 to generate a TO output signal on line 526. Nothing else happens then until one of the data entry keys of the keyboard of FIG. 2 is depressed. This produces a 6-bit code on the output lines of the keyboard 60. The four leas significant bits K1, K2, K4, K8 are coupled by the programmer register gate 510 to the four least significant bits of the programmer shift register 512. A code generator 530 responsive to the TO signal and the keyboard strobe jams a bit configuration into the four most significant bits of the shift register 512 which designates a branch instruction (branch instructions have been previously discussed, particularly in conjunction with Table II) identifying one of 16 locations in the PAM 514. That is, the code generator 530 jams bits 11 (BRANCH instruction code) into gates 532 and 534 within the lines coupling the C and D bits from the register gates 510 to the two most significant bits of the shift register 512. Additionally, the code generator 530 jams two bits into gates 536 and 538 which identify the program alterable memory 514. Other bit configurations in bits A and B of course, would identify other portions of the program read-only memory 70. The four least significant bits loaded into shift register 512 will, of course, be determined by the data entry key actuated after the TO( ) key. These four bits identify one of 16 locations within the PAM 514.

This BRANCH instruction loaded into the shift register 512 with the LOAD and STEP latches disengaged is immediately transferred to the instruction register which, as in response to any BRANCH instruction, causes the program counter to branch to the identified 6-bit address identified thereby. Accordingly, the program counter then defines the starting location within the PAM 514 desired by the user.

The user then actuates the LOAD key to define a load mode. He then presses the desired keyboard keys in the sequence in which he desires them to occur in the program. Each key depression causes the respective 6-bit instruction code to be entered into the shift register 512 and to be loaded into successive locations within the PAM 514 under the control of the program counter 74. By latching the P switch on keyboard 500, the octal coded address of the next PAM location to be loaded can be observed on the indicator lights 502, 504 and 506. When the last key in the program is pressed, the program is fully loaded. It is to be noted that the depression of each keyboard key generates a 6-bit code which passes through the shift register 512 and is loaded into a 9-bit register within the PAM. As noted in the case of the keyboard loaded instruction, bit 9 will be a zero indicating that it is a keyboard code and bits 7 and 8 will be meaningful.

In loading a program into the PAM 514 from the card reader, the 8-bit instructions are passed through the register gates 510 into the shift register 512. The ninth bit is provided by the card reader to flip-flop 526. The nine bits are then shifted from the shift register 512 and flip-flop 526 into a PAM location as defined by the program counter 74.

In order to execute a program from the PAM 514, the LOAD switch must be disengaged which thereby defines a program run mode as evidenced by an enabling signal being provided on the PRUN output terminal of the programmer control logic 518. When the RESUME key on keyboard 500 is then energized with the program run mode being defined, a RUN2 mode is established as evidenced by an enabling signal being provided by control logic 518 which then enables the calculator to run. That is, it enables the timing counter of FIG. 3(*a*) to sequentially increment or otherwise operate on the program counter 74 to sequentially access instructions from the program memory which will, of course, constitute the alterable portion 514 of the program memory when user stored programs are being executed.

Instructions are serially accessed from the PAM 514 from locations defined by the program counter 74. The 9-bit instructions are shifted through the flip-flop 526 and into the programmer shift register 512. If bit 9 of an instruction is a 1, this means that the instruction constitutes an internal level instruction and as a consequence, when in the RUN2 mode, the eight bits of the instruction will be shifted out of the register 512 and be put on the previously discussed PROM bus 72. The bus 72 is coupled to the input of gate 64 which applies the instruction to the instruction register 66. On the other hand, if a keyboard instruction is read out of PAM 514 into the register 512, as evidenced by bit 9 being equal to 0, then the six least significant bits of the instruction will be channeled by the register gates 510 into the compiler logic 62. The compiler logic 62 will operate as previously discussed in conjunction with FIG. 9 and Table V to load an appropriate jump instruction into the instruction register 66.

Accordingly, it should now be appreciated that so far as the instruction register and program counter are concerned, it makes no difference as to whether instructions are coming directly from the keyboard or program read-only memory 70 or whether they are coming from the alterable program memory (PAM) 514.

As can be seen in the simple user stored program shown in Appendix Table XI, a HALT instruction can be incorporated into the program within the PAM 514 to halt the execution of the program from the PAM in order to enable a user to input a variable, for example. When a HALT instruction is executed from the PAM 514, it resets the RUN2 mode and generates a store P signal from control logic terminal 540 to store the program count plus one in the 12-bit store 520. With the RUN2 mode not defined, the user can then actuate the keyboard to input variables and the calculator will operate just as described in conjunction with FIGS. 1—9. After completing the entry of data, the user can then actuate the resume key which will then reestablish the RUN2 mode. A recall P signal will be generated to shift the stored count from store 520 to the program counter to then enable the execution of the program from the PAM 514 to be resumed.

The calculator can be run in a verify mode or step mode. The verify mode enables a user to verify the program stored within the PAM 514 without executing the program. This is done by disengaging the LOAD and STEP latches to define a run continuous mode. Actuation of the TO( ) key and a data entry key then sets the program counter 74 to the starting location of the desired program. The P switch on keyboard 500 should then be engaged to enable the user to observe that the program counter 74 defines the correct starting location. The LOAD key is then latched to define the load mode and the I key is then latched to enable the user to observe the contents of the starting program location. The RESUME key is then actuated and the program counter is advanced by one with the contents of the next PAM location being displayed. Each time the RESUME key is depressed the program counter is advanced by one and the contents of the indicated location are displayed without executing the instruction. Since the load mode is used for this procedure, the contents of a PAM location can be changed by pressing the appropriate keyboard key.

It will be recognized that the foregoing verification procedure requires that the calculator operate in a single instruction mode meaning that the run mode (i.e., sequencing of the timing counter of FIG. 3(*a*)) is terminated after each instruction is accessed from the PAM 514, requiring that the RESUME key be again depressed to increment to the P counter. The single instruction (SI) mode is defined by the program control logic 518. The single instruction mode is defined whenever the TO flag is set, or when the load mode is defined.

Additionally, the single instruction mode is also established when the step mode is defined by actuation of the STEP key or keyboard 500 and when the load mode is not defined. In this situation, the program counter 74 is inhibited from incrementing each time after it addresses the PAM 514. The step mode can be used to test a program. If an error is suspected, the program should first be verified by the previously discussed verification procedure. After verification, the step mode can be used to execute the program one step at a time. This means one step of the stored program. It should be recognized that the accessing of one instruction from the PAM 514 may, for example, cause the execution of a subroutine from the program read-only memory 70. It is not, of course, desired to stop after each instruction readout from the program read-only memory and, thus, when in the step mode, the program counter 74 is monitored to sense when it addresses the PAM 514.

Table XI illustrates a simple program which can be entered into the PAM 514 from the keyboard to determine the volume of a sphere. In order to execute this program, the user must first actuate the TO key and appropriate data entry key to cause the program counter 74 to branch to the PAM location storing the initial instruction in the program of FIG. 10. Then he must enter the value R. Then, actuation of the RESUME key will cause the program of Table XI to be run to determine and display the volume of a sphere having a radius equal to the value R. The punched card of FIG. 15 shows how the program of Table XI can be represented.

From the foregoing, it should be appreciated that a calculator apparatus has been disclosed herein which enables a user to present a problem in algebraic notation. Internally, the calculator apparatus converts the user notation into an appropriate machine notation through the use of compiler logic. Various operations are initiated by the user by the actuation of various keyboard keys. Most of these operations require the execution of many internal level instructions which are automatically accessed from a read-only memory. As an optional feature of the disclosed calculator apparatus, means are provided for storing a program in an alterable portion of the program memory, storage either being via the keyboard or some storage medium reader such as a card reader. The stored program can then be executed by the calculator in the same manner as if it were being executed from the keyboard and program read-only memory. It will be recognized that the alterable portion of the program memory 514 can be utilized to store special subroutines and thus supplement the subroutines stored in the read-only portion of the program memory.

Although a preferred embodiment of the invention has been disclosed herein, it will be recognized by those skilled in the art that many modification and revisions can be made therein without departing from the spirit or scope of the invention.

TABLE 1.—CALCULATOR KEYS

| Key or switch | Functions |
|---|---|
| 0 through 9 (Numeric keys). | Enters the respective value into the E register. If a numeric key is the first entry after the calculator has completed an operation the sign of the E register is automatically set positive. Subsequent numeric key entries do not alter the sign of the E register. Up to 14 numeric digits may be entered as the mantissa but only the 10 most significant are displayed. If more than 14 digits are entered, an overflow condition occurs and only the 14 most significant digits are retained in the E register. |
| CHG SIGN | Changes the sign of the contents in the E register. If the CHG SIGN key is the first entry after the calculator has completed an operation, the sign of the next entry is negative. That is, the SIGN key is considered to be the first item of the data entry. |
| .(Decimal point) | Terminates the integer part of a numeric entry and defines the start of the fractional part. If the decimal point key is the first entry after the calculator has completed an operation, the value "0" is entered into the E register. |
| EXP (Exponent) | Terminates the mantissa entry and permits a two-digit exponent and exponent sign to be entered. If the exponent key is the first entry after the calculator has completed an operation, the value "1.0" is assumed as the mantissa. The value of the exponent in the E register is the algebraic sum of the exponent entered and the number of decimal places in the mantissa. Entering the second decimal digit of the exponent terminates the exponent entry condition. An overflow occurs if the exponent exceeds the value ±99. |
| $\pi$(Pi) | Enters the constant $\pi$ into the 14 digits of the E register. To enter the value $-\pi$, press the SIGN key after entering the value $\pi$. |
| $\epsilon$ (Epsilon) | Enters the constant $\epsilon$ into the 14 digits of the E register. To enter the value $-\epsilon$, press the SIGN key after entering the value $\epsilon$. |
| + (Add) | Algebraically adds the next following data entry to the contents of the E register. |
| − (Subtract) | Algebraically subtracts the next following data entry from the contents of the E register. |
| × (Multiply) | Multiplies the contents of the E register by the next following data entry. The product is stored in the E register after decimal alignment. The multiplier is retained in the M register to allow multiplication by a constant as shown in the following example:<br>Step— a. b. c. d. (E) e. f. (E) g. h. (E)<br>Key— 3 × 5 = 15 4 = 20 5 = 25 |
| ÷ (Divide) | Divides the contents of the E register by the next following data entry. The quotient is stored in the E register after decimal alignment. The divisor is retained in the M register to allow division by a constant as shown by the example:<br>Step— a. b. c. d. (E) e. f. (E) g. h. (E)<br>Key— 1 ÷ 3 = 0.333 . . . 2 = 0.666 . . . 3 = 1.0 |
| =(Equals) | Executes the last entered arithmetic or algebraic function and terminates the algebraic sequence of operations. The equals key need only be used to teminate a particular computational sequence when the results of that sequence must be obtained. The results are stored in the E register after decimal point alignment, and may be used as the first entry of a subsequent arithmetic or algebraic sequence. Multiple equals key entries without intervening data entries or instructions do not alter the contents of the E register. |
| ↓( ) (Store n) | Pressing the ST(n) key followed by a single digit (0 through 9) entry, transfers the contents of the E register to a single data register identified by the numeric entry. The contents of the E register remain unchanged. |
| ↑( ) (Recall n) | Pressing the RCL(n) key followed by a single digit (0 through 9) entry, transfers the contents of the register identified by the numeric entry, to the E register. The contents of the data storage register remain unchanged. |
| ↕( ) (Exchange n) | Pressing the EXCH(n) key followed by a single digit (0 through 9) entry, exchanges the contents of the identified register with the contents of the E register. No information is lost as a result of this operation. |
| ↑(0) (Recall 0) | Provides a single-key access for data retrieval from register 0. Pressing the RCL(0) key transfers the contents of register 0 to the E register. The contents of register 0 remain unchanged. |

Table 1—Continued

| Key or switch | Functions |
|---|---|

2nd FUNC ........ Provides a single-key access for data retrieval from register 9. Pressing the 2nd FUNC key transfers the contents of register 9 to the E register. The contents of register 9 remain unchanged.

$\bar{\bar{\Sigma}}_7$ (Summation to storage 7). Terminates the previous sequence of operations (result in E register), adds the contents of register 7 to the contents of the E register, and stores the sum in register 7. The contents of the E register remain unchanged. Multiple $\bar{\bar{\Sigma}}_7$ key depressions, without intervening data entries or instructions do not alter the contents of the E register. Example:

5×3=15
6×7=42
Total———$\overline{57}$ (Contents of Register 7)

| Step | a. | b. | c. | d. | e. | f. | g. | h. | i. | j. | k. |
|---|---|---|---|---|---|---|---|---|---|---|---|
| Key | CLEAR | X ST(n) | 7 | 5 | x | 3 | $\bar{\bar{\Sigma}}_7$ | 6 | x | 7 | $\bar{\bar{\Sigma}}_7$ |
| E Reg. | 0.0 | 0.0 | 0.0 | 5 | 5 | 3 | 15 | 6 | 6 | 7 | 42 |
| Reg. 7 | 999.. | 999. | 0 | 0 | 0 | 0 | 15 | 15 | 15 | 15 | 57 |

$\bar{\bar{\Sigma}}_8$ (Summation to storage 8). Terminates the previous sequence of operations (result in E register), adds the contents of register 8 to the contents of the E register, and stores the sum in register 8. The contents of the E register remain unchanged. Multiple $\bar{\bar{\Sigma}}_8$ key depressions, without intervening data entries or instructions do not alter the contents of the E register. The example for $\bar{\bar{\Sigma}}_7$ may also be applied to the $\bar{\bar{\Sigma}}_8$ key.

SIN COS ........ Calculates the sine and cosine values of the previous data entry or result (as the argument) in degrees. The argument may be expressed in positive or negative angles. After execution, the sine of the angle is stored in the E register as the current value; the cosine is stored in register 9 and may be retrieved by pressing the 2nd FUNC key. The argument may range from 0° to angles greater than 360°. Accuracy of the result decreases when the angle exceeds 1,000°. The sign of the results (sine and cosine) is trigonometrically correct and depends on the quadrant of the argument as follows:

| Argument | Sine | Cosine |
|---|---|---|
| 0–90° | + | + |
| 90–180° | + | − |
| 180–270° | − | − |
| 270–360° | − | + |

The sine-cosine routine does not complete an algebraic sequence; thus a computational sequence must be terminated by an equals (=) operation before executing the sine-cosine calculation. Executing the sine-cosine routine alters the contents of registers 7 and 8.

Example: Sin 25°, Cosine 25°

| Step | a. | b. | c. | (Result sin) | d. | (Result cosine) |
|---|---|---|---|---|---|---|
| Key | 2 | 5 | SIN COS | | 2nd FUNC | |
| E Reg. | 2 | 25 | 25 | 0.4226 . . . | | 0.9063 . . . |

$SIN^{-1}$ $COS^{-1}$ ........ Calculates the inverse trigonometric functions arcsine and arccosine using the contents of the E register as the operand. After execution, the resultant angles are expressed in radians. The arcsine is stored in the E register; the arccosine is stored in register 9 and may be retrieved by pressing the 2nd FUNC key. The quadrant of the resultant angle depends on the sign of the argument as follows:

| Argument | |
|---|---|
| 0 through 1.0 | 0 through $\pi/2$ radians (1st quadrant) |
| | $-\pi/2$ through $\pi$ radians (3rd quadrant) |
| 0 through −1.0 | 0 through $-\pi/2$ radians (4th quadrant) |
| | $\pi/2$ through $\pi$ radians (2nd quadrant) |

An argument greater than 1.0 or −1.0 results in an error indication. Execution of the arcsine/arccosine routine alters the contents of registers 7 and 8.

R→° ........ Converts the contents of the E register from radians to degrees. Multiple 2 radians are converted into multiple 360° angles. The radians-to-degrees conversion allows the trigonometric and inverse trigonometric functions to be expressed in both radians and degrees. All trigonometric functions assume the operand is in degrees while all inverse trigonometric functions yield their result in radians.

$LOG_{10}$ ln ........ Calculates the logarithm to the base 10 and to the base $\epsilon$ (epsilon), or natural log, using the contents of the E register as the argument. After execution, the log 10 value is stored in the E register and the natural log is stored in register 9. The natural log may be retrieved by pressing the 2nd FUNC key. If the argument is negative, an error indication occurs. A previous algebraic or arithmetic sequence must be terminated by an equals (=) operation before executing the logarithm instruction. Executing the logarithm instruction alters register 8.

$a^x$ ........ Raises the value in the E register ($a$) to the power designated by the next following data entry ($x$). The result, $a^x$, is stored in the E register. The values for $a$ and $x$ may be signed decimal numbers. If the value for $a$ is negative, the value for the exponent $x$ must be positive or else an error indication occurs. The value for $a$ may be the result of an algebraic sequence and need not be terminated by an equals operation. The following should be noted:
a. Raising a number to the power 0 yields the value 1.
b. Raising the value 0 to any power other than 0 yields 0.
c. Raising the value 0 to the power 0 yields an error.
The $a^x$ routine alters the contents of registers 7 and 8.

$\frac{1}{x}$ ........ Calculates the reciprocal of the contents of the E register. After execution, the reciprocal is stored in the E register. A previous arithmetic or algebraic sequence must be terminated by an equals (=) operation before executing the reciprocal instruction.

$\sqrt{\ }$ ........ Calculates the square root of the value in the E register. After execution, the result is stored in the E register. If the argument of the square root is negative, an error indication results. A previous arithmetic or algebraic sequence must be terminated by an equals (=) operation before executing the square root instruction.

X! ........ Calculates the factorial of the integer value in the E register. The maximum integer value allowed is 69. A larger value than 69 the square root is negative, an error indication results. A previous arithmetic or algebraic sequence must be terminated by an results in an overflow condition because the 99th power is exceeded. An error also results if the value in the E register is either a non-integer or a negative value. A previous arithmetic or algebraic sequence must be terminated by an equals (=) operation before executing the factorial instruction.

∡ ........ Converts a pair of rectangular coordinates to the equivalent polar coordinates. The polar coordinates consist of the angular displacement and the length of vector (hypothenuse). Pressing the key identifies the contents of the E register as the adjacent side of the conversion right-triangle. The value of the opposite side must be the next following entry. Then the conversion must be terminated by an equals (=) operation or by a computational instruction that includes an implied equals. After execution, the angular displacement in radians is stored in the E register and the length of vector is stored in register 9. The length of vector may be retrieved by pressing the 2nd FUNC key. Angles are expressed in values 0 through $\pi$ and 0 through $-\pi$. The rectangular to polarcon version instruction may terminate a previous algebraic or arithmetic sequence. The contents of registers 7 and 8 is altered by the instruction.

$\Sigma_N{}^2$ ........ The statistical function key yields four results, using the contents of the E register as the operand $x$. The results are:
a. $x^2$ stored in the E register
b. N or unit count stored in register 9
c. The sum of $x^2$ ($\Sigma_x{}^2$) is obtained by adding $x^2$ to the contents of register 8. The sum is restored to register 8
d. The sum of $x$ ($\Sigma_x$) is obtained by adding the value $x$ to the contents of register 7.

A previous arithmetic or algebraic sequence must be terminated by an equals (=) operation before executing the statistical function instruction.

Example: $x_1=2$, $x_2=-3$, $x_3=5$, $\Sigma_x{}^2=38$, $\Sigma_N=4$ $N=3$

| Step | a. | b. | c. | d. | e. | f. | g. | h. | i. | j. | k. | l. | m. |
|---|---|---|---|---|---|---|---|---|---|---|---|---|---|
| Key | CLEAR | 2 | $\Sigma_N{}^2$ | SIGN | 3 | $\Sigma_N{}^2$ | 5 | Σ | ↑() | 7 | ↑() | 8 | 2nd FUNC |
| Reg. E | 0 | 2 | 4 | −4 | −3 | 9 | 5 | 25 | 25 | 4 | 4 | 38 | 3 |
| Reg. 9 | 0 | 0 | 1 | 1 | 1 | 2 | 2 | 3 | 3 | 3 | 3 | 3 | 3 |
| Reg. 8 | 0 | 0 | 4 | 4 | 4 | 13 | 13 | 38 | 38 | 38 | 38 | 38 | 38 |
| Reg. 7 | 0 | 0 | 2 | 2 | 2 | −1 | −1 | 4 | 4 | 4 | 4 | 4 | 4 |

CLEAR X ........ Pressing the CLEAR X key resets the contents of the E register to 0 and also resets the overflow and error conditions. The CLEAR X instruction does not terminate a previous arithmetic or algebraic sequence.

RESET ........ Resets the contents of registers E, A, M, 7, 8 and 9 to zero. The RESET key also resets the overflow and error conditions. If a previous algebraic or arithmetic sequence is in progress when the RESET key is pressed, executing the reset instruction terminates that sequence.

| | 8421 | BA 00 | BA 01 | BA 10 | BA 11 |
|---|---|---|---|---|---|
| 00 | 0000 | STOP(=) | K0 | + | Sin cos |
| 01 | 0001 | STO | 1 | | |
| 02 | 0010 | $\Sigma^7$ | 2 | (−) | Arc sin cos |
| 03 | 0011 | $\Sigma^4$ | 3 | | |
| 04 | 0100 | CALL | 4 | X+ | x! |
| 05 | 0101 | STN | 5 | | |
| 06 | 0110 | Print E | 6 | X− | R |
| 07 | 0111 | Print A1L | 7 | | |
| 08 | 1000 | XCEN | K#(8) | X | $\log_{10}$ |
| 09 | 1001 | RCN | 9 | | |
| 10 | 1010 | RCD | DP | ÷ | $\Sigma_x{}^2$ |
| 11 | 1011 | | Sign | | |
| 12 | 1100 | RCI | Exp | $\alpha^x$ | $1/x$ |
| 13 | 1101 | | CLE | | |
| 14 | 1110 | RC9 | ε | $\sqrt{a^2b^2}$ | $\sqrt{\ }$ |
| 15 | 1111 | | π | | |
| | | | K | AR AR | FC |

KEYBOARD CODES

Table II

| | | | | | | | | |
|---|---|---|---|---|---|---|---|---|
| D | 0 | 0 | 0 | 0 | 0 | 0 | 0 | 0 |
| C | 0 | 0 | 0 | 0 | 1 | 1 | 1 | 1 |
| B | 0 | 0 | 1 | 1 | 0 | 0 | 1 | 1 |
| A | 0 | 1 | 0 | 1 | 0 | 1 | 0 | 1 |
| 1 2 4 8 | | | | | | | | |
| 0 0 0 0 | STOP | SHRA | STR1 | RCR1 | LIX0 | SFS1 | SKF1 | SFLF |
| 1 0 0 0 | HALT | SHLA | STR2 | RCR2 | LIX1 | SFS2 | SKF2 | SFL2 |
| 0 1 0 0 | XCEA | SHRE | STR3 | RCR3 | LIX2 | SFS3 | SKF3 | SFL3 |
| 1 1 0 0 | XCMA | CLRE | STR4 | RCR4 | LIX3 | SFS4 | SKF4 | SFL4 |
| 0 0 1 0 | CHSN | CLRA | STR5 | RCR5 | LIX4 | SFS5 | SKF5 | SFL5 |
| 1 0 1 0 | CHSX | CALL | STR6 | RCR6 | LIX5 | SFS6 | SKF6 | SFL6 |
| 0 1 1 0 | STXA | ADRP | STR7 | RCR7 | LIX6 | SFS7 | SKF7 | SFL7 |
| 1 1 1 0 | RCXA | SBRP | STR8 | RCR8 | LIX7 | SFS8 | SKF8 | SFL8 |
| 0 0 0 1 | ADDN | SFAE | STRW | RCRW | LIX8 | SERR | SKFA | RFL4 |
| 1 0 0 1 | SUBN | SFEA | STRX | RCRX | LIX9 | SOFL | SKFB | RFL6 |
| 0 1 0 1 | ADDX | SFNE | STRY | RCRY | RSI1 | RFLF | SKFC | RFL8 |
| 1 1 0 1 | SUBX | SFRA | STRZ | RCRZ | INI1 | SKI0 | SKFD | RSFL |
| 0 0 1 1 | INXA | SFNZ | XFEM | XFME | DCI1 | SKLD | SKFE | LDDP |
| 1 0 1 1 | INXE | SFAN | XFEA | XFAE | LDIX | SKX0 | SKFF | RSI2 |
| 0 1 1 1 | DCXA | SFEN | | | XFIM | SKXP | CHPG | PRI2 |
| 1 1 1 1 | DCXE | SFEO | STR0 | RCR0 | XFIE | SKD0 | NCLF | INI2 |
| | Data Modification | | | | Control | | | |

| | | INSTRUCTION CODE | P COUNTER |
|---|---|---|---|
| | | D C B A 8 4 2 1 | 11 10 9 8 7 6 5 4 3 2 1 |
| Address Modification | BRANCH | 1 1 M N P Q R S | Z M N P Q R S 0 0 0 0 and store P Count plus one (Z determined by CHPG flag) |
| | JUMP | 1 0 M N P Q R S | Y Y Y Y Y M N P Q R S (Y Y Y Y Y are previous value) |

Table III

| CODE 1 2 4 8 A B C D | mnemonic | DESCRIPTION |
|---|---|---|
| 0 0 0 0 0 0 0 0 | STOP | STOP |
| 1 0 0 0 0 0 0 0 | HALT | HALT (CARD READER INSTRUCTION) |
| 0 1 0 0 0 0 0 0 | XCEA | EXCHANGE E AND A |
| 1 1 0 0 0 0 0 0 | XCMA | EXCHANGE M AND A |
| 0 0 1 0 0 0 0 0 | CHSN | CHANGE NUMERICAL SIGN OF E |
| 1 0 1 0 0 0 0 0 | CHSX | CHANGE EXPONENT SIGN OF E |
| 0 1 1 0 0 0 0 0 | STXA | STORE EXPONENT OF A (and Exp. sign) IN EXPONENT STORE |
| 1 1 1 0 0 0 0 0 | RCXA | RECALL EXP OF A (and exp sign) FROM EXPONENT STORE |
| 0 0 0 1 0 0 0 0 | ADDN | ADD NUMERICAL PORTION OF E TO A |
| 1 0 0 1 0 0 0 0 | SUBN | SUBTRACT NUMERICAL PORTION OF E FROM A |
| 0 1 0 1 0 0 0 0 | ADDX | ADD EXP. OF E TO EXP. OF A |
| 1 1 0 1 0 0 0 0 | SUBX | SUBTRACT EXP. OF E FROM EXP. OF A |
| 0 0 1 1 0 0 0 0 | INXA | INCREMENT EXPONENT OF A |
| 1 0 1 1 0 0 0 0 | INXE | INCREMENT EXPONENT OF E |
| 0 1 1 1 0 0 0 0 | DCXA | DECREMENT EXPONENT OF A |
| 1 1 1 1 0 0 0 0 | DCXE | DECREMENT EXPONENT OF E |
| 0 0 0 0 1 0 0 0 | SHRA | SHIFT NUMERICAL PORTION OF A RIGHT |
| 1 0 0 0 1 0 0 0 | SHLA | SHIFT NUMERICAL PORTION OF A LEFT |
| 0 1 0 0 1 0 0 0 | SHRE | SHIFT NUMERICAL PORTION OF E RIGHT |
| 1 1 0 0 1 0 0 0 | CLRE | CLEAR E |
| 0 0 1 0 1 0 0 0 | CLRA | CLEAR A |
| 1 0 1 0 1 0 0 0 | CALL | CLEAR E AND A |
| 0 1 1 0 1 0 0 0 | ADRP | IF INDEX 1 ≠ 0, ADD E TO A & DECREMENT INDEX 1 |

Table III – Continued

| CODE 1 2 4 8 A B C D | mnemonic | DESCRIPTION |
|---|---|---|
| 1 1 1 0 1 0 0 0 | SBRP | IF A ≧ E, SUBTRACT E FROM A AND INCREMENT INDEX 1 |
| 0 0 0 1 1 0 0 0 | SFAE | SET FLAG 1 IF A > E |
| 1 0 0 1 1 0 0 0 | SFEA | SET FLAG 1 IF E > A |
| 0 1 0 1 1 0 0 0 | SFNE | SET FLAG 1 IF E ≠ A |
| 1 1 0 1 1 0 0 0 | SFRA | SET FLAG 1 IF $R_0$ > A |
| 0 0 1 1 1 0 0 0 | SFNZ | SET FLAG 1 IF A ≠ 0 |
| 1 0 1 1 1 0 0 0 | SFAN | SET FLAG 1 IF A ≦ 0 |
| 0 1 1 1 1 0 0 0 | SFEN | SET FLAG 1 IF E ≦ 0 |
| 1 1 1 1 1 0 0 0 | SFEO | SET FLAG 1 IF E = 0 |
| 0 0 0 0 0 1 0 0 | STR1 | TRANSFER CONTENTS OF E to R1 |
| 1 0 0 0 0 1 0 0 | STR2 | " " " E to R2 |
| 0 1 0 0 0 1 0 0 | STR3 | " " " R3 |
| 1 1 0 0 0 1 0 0 | STR4 | " " " R4 |
| 0 0 1 0 0 1 0 0 | STR5 | " " " R5 |
| 1 0 1 0 0 1 0 0 | STR6 | " " " R6 |
| 0 1 1 0 0 1 0 0 | STR7 | " " " R7 |
| 1 1 1 0 0 1 0 0 | STR8 | " " " R8 |
| 0 0 0 1 0 1 0 0 | STRW | " " " RW |
| 1 0 0 1 0 1 0 0 | STRX | " " " RX |
| 0 1 0 1 0 1 0 0 | STRY | " " " RY |
| 1 1 0 1 0 1 0 0 | STRZ | " " " RZ |
| 0 0 1 1 0 1 0 0 | XFEM | " " " M |
| 1 0 1 1 0 1 0 0 | XFEA | " " " A |
| 0 1 1 1 0 1 0 0 | | |
| 1 1 1 1 0 1 0 0 | STRO | TRANSFER CONTENTS OF E TO RO |
| 0 0 0 0 1 1 0 0 | RCR1 | TRANSFER CONTENTS OF R1 to E |
| 1 0 0 0 1 1 0 0 | RCR2 | " R2 " E |
| 0 1 0 0 1 1 0 0 | RCR3 | " R3 " E |
| 1 1 0 0 1 1 0 0 | RCR4 | " R4 |
| 0 0 1 0 1 1 0 0 | RCR5 | " R5 |
| 1 0 1 0 1 1 0 0 | RCR6 | " R6 |
| 0 1 1 0 1 1 0 0 | RCR7 | " R7 |
| 1 1 1 0 1 1 0 0 | RCR8 | " R8 |
| 0 0 0 1 1 1 0 0 | RCRW | TRANSFER CONTENTS OF RW TO E |
| 1 0 0 1 1 1 0 0 | RCRX | " " " RX " " |
| 0 1 0 1 1 1 0 0 | RCRY | " " " RY " " |
| 1 1 0 1 1 1 0 0 | RCRZ | RZ |
| 0 0 1 1 1 1 0 0 | XFME | M |
| 1 0 1 1 1 1 0 0 | XFAE | A |
| 0 1 1 1 1 1 0 0 | | |
| 1 1 1 1 1 1 0 0 | RCRO | TRANSFER CONTENTS OF RO TO E |
| 0 0 0 0 0 0 1 0 | LIXO | SET INDEX 1 to 0, STORE P AND BRANCH TO 01,00 |
| 1 0 0 0 0 0 1 0 | LIX1 | " 1 " |
| 0 1 0 0 0 0 1 0 | LIX2 | " 2 |
| 1 1 0 0 0 0 1 0 | LIX3 | 3 |
| 0 0 1 0 0 0 1 0 | LIX4 | 4 |
| 1 0 1 0 0 0 1 0 | LIX5 | 5 |
| 0 1 1 0 0 0 1 0 | LIX6 | 6 |
| 1 1 1 0 0 0 1 0 | LIX7 | 7 |
| 0 0 0 1 0 0 1 0 | LIX8 | 8 |
| 1 0 0 1 0 0 1 0 | LIX9 | 9 |
| 0 1 0 1 0 0 1 0 | RSI1 | RESET INDEX 1 to ZERO |
| 1 1 0 1 0 0 1 0 | INI1 | INCREMENT INDEX 1 |
| 0 0 1 1 0 0 1 0 | DCI1 | DECREMENT INDEX 1 |
| 1 0 1 1 0 0 1 0 | LDIX | LOAD INDEX 1, from INDEX 2 LOCATION OF M |
| 0 1 1 1 0 0 1 0 | XFIM | TRANSFER INDEX 1 to INDEX 2 LOCATION OF M |
| 1 1 1 1 0 0 1 0 | XFIE | TRANSFER INDEX 1 to INDEX 2 location of E |
| 0 0 0 0 1 0 1 0 | SFS1 | SET FLAG 1 IF SWITCH 1 CLOSED |
| 1 0 0 0 1 0 1 0 | SFS2 | 2 |
| 0 1 0 0 1 0 1 0 | SFS3 | 3 |
| 1 1 0 0 1 0 1 0 | SFS4 | 4 |
| 0 0 1 0 1 0 1 0 | SFS5 | 5 |
| 1 0 1 0 1 0 1 0 | SFS6 | SET FLAG 1 IF SWITCH 6 CLOSED |
| 0 1 1 0 1 0 1 0 | SFS7 | " " 1 " " 7 CLOSED |
| 1 1 1 0 1 0 1 0 | SFS8 | 8 |
| 0 0 0 1 1 0 1 0 | SERR | SET ERROR FF |
| 1 0 0 1 1 0 1 0 | SOFL | SET OVERFLOW FF |
| 0 1 0 1 1 0 1 0 | RFLF | RESET FLAG F |
| 1 1 0 1 1 0 1 0 | SKI0 | SKIP IF INDEX 1 = 0 |
| 0 0 1 1 1 0 1 0 | SKLD | SKIP IF INDEX 1 ≠ LEAST SIG.DIGIT POSITION |
| 1 0 1 1 1 0 1 0 | SKX0 | SKIP IF EXPONENT A = 0 |
| 0 1 1 1 1 0 1 0 | SKXP | SKIP IF EXPONENT A = POSITIVE (OR 0) |
| 1 1 1 1 1 0 1 0 | SKPO | SKIP IF DO POSITION OF A IS NON-ZERO(15≠0) |

Table III – Continued

| CODE 1 2 4 8 A B C D | mnemonic | DESCRIPTION |
|---|---|---|
| 0 0 0 0 0 1 1 0 | SKF1 | SKIP IF FLAG 1 SET AND RESET FLAG 1 |
| 1 0 0 0 0 1 1 0 | SKF2 | SKIP IF FLAG 2 SET |
| 0 1 0 0 0 1 1 0 | SKF3 | " " 3 " |
| 1 1 0 0 0 1 1 0 | SKF4 | 4 |
| 0 0 1 0 0 1 1 0 | SKF5 | 5 |
| 1 0 1 0 0 1 1 0 | SKF6 | 6 |
| 0 1 1 0 0 1 1 0 | SKF7 | 7 |
| 1 1 1 0 0 1 1 0 | SKF8 | 8 |
| 0 0 0 1 0 1 1 0 | SKFA | A |
| 1 0 0 1 0 1 1 0 | SKFB | B |
| 0 1 0 1 0 1 1 0 | SKFC | C |
| 1 1 0 1 0 1 1 0 | SKFD | D |
| 0 0 1 1 0 1 1 0 | SKFE | E |
| 1 0 1 1 0 1 1 0 | SKFF | F |
| 0 1 1 1 0 1 1 0 | CHPG | CHANGE PAGE ON NEXT BRANCH INSTRUCTION |
| 1 1 1 1 0 1 1 0 | RCLP | RECALL P COUNT FROM P STORE |
| 0 0 0 0 1 1 1 0 | SFLF | SET FLAG F |
| 1 0 0 0 1 1 1 0 | SFL2 | SET FLAG 2 |
| 0 1 0 0 1 1 1 0 | SFL3 | 3 |
| 1 1 0 0 1 1 1 0 | SFL4 | 4 |
| 0 0 1 0 1 1 1 0 | SFL5 | 5 |
| 1 0 1 0 1 1 1 0 | SFL6 | 6 |
| 0 1 1 0 1 1 1 0 | SFL7 | 7 |
| 1 1 1 0 1 1 1 0 | SFL8 | 8 |
| 0 0 0 1 1 1 1 0 | RFL4 | RESET FLAG 4 |
| 1 0 0 1 1 1 1 0 | RFL6 | " " 6 |
| 0 1 0 1 1 1 1 0 | RFL8 | " " 8 |
| 1 1 0 1 1 1 1 0 | RSFL | RESET ALL FLAGS |
| 0 0 1 1 1 1 1 0 | LDDP | LOAD DEC. PT. SWITCH TO INDEX 1 |
| 1 0 1 1 1 1 1 0 | RSI2 | RESET INDEX 2 to D1 POSITION |
| 0 1 1 1 1 1 1 0 | PRI2 | PRESET INDEX 2 to "EXP. TENS" POSITION |
| 1 1 1 1 1 1 1 0 | INI2 | INCREMENT INDEX 2 |

Table IV

| | Memory Input 22 | 21 | 20 | 19 | 18 | 17 | 16 | 15 | 14 | 13 | 12 | Memory Output 11 | 10 | 9 | 8 | 7 | 6 | 5 | 4 | Adder 3 | 2 | 1 |
|---|---|---|---|---|---|---|---|---|---|---|---|---|---|---|---|---|---|---|---|---|---|---|
| STOP | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| HALT | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| XCEA | 0 | 1 | 0 | 1 | 1 | 1 | 1 | 0 | 0 | 0 | 0 | 0 | 0 | 1 | 0 | 0 | 0 | 1 | 1 | 0 | 0 | 1 |
| XCMA | 0 | 1 | 0 | 0 | 1 | 1 | 0 | 1 | 0 | 0 | 0 | 0 | 0 | 0 | 0 | 0 | 0 | 1 | 1 | 0 | 0 | 1 |
| CHSM | 0 | 0 | 0 | 0 | 1 | 1 | 0 | 1 | 0 | 0 | 0 | 0 | 0 | 1 | 0 | 1 | 1 | 1 | 0 | 0 | 0 | 1 |
| CHSX | 0 | 0 | 0 | 0 | 1 | 1 | 0 | 1 | 0 | 0 | 0 | 0 | 0 | 1 | 0 | 1 | 1 | 0 | 0 | 0 | 0 | 1 |
| STXA | 1 | 0 | 0 | 0 | 0 | 0 | 0 | 0 | 0 | 0 | 0 | 0 | 0 | 0 | 0 | 0 | 1 | 0 | 0 | 0 | 0 | 1 |
| RCXA | 1 | 1 | 1 | 0 | 0 | 0 | 1 | 0 | 0 | 0 | 0 | 0 | 0 | 0 | 0 | 0 | 1 | 0 | 0 | 0 | 0 | 1 |
| ADDN | 0 | 1 | 1 | 0 | 0 | 0 | 0 | 0 | 0 | 0 | 0 | 0 | 0 | 0 | 1 | 0 | 0 | 1 | 1 | 1 | 0 | 0 |
| SUBN | 0 | 1 | 1 | 0 | 0 | 0 | 0 | 0 | 0 | 0 | 0 | 0 | 0 | 1 | 0 | 0 | 1 | 1 | 1 | 1 | 1 | 0 |
| ADDX | 0 | 1 | 1 | 0 | 0 | 0 | 0 | 0 | 0 | 0 | 0 | 0 | 0 | 1 | 0 | 0 | 1 | 0 | 1 | 1 | 0 | 0 |
| SUBX | 0 | 1 | 1 | 0 | 0 | 0 | 0 | 0 | 0 | 0 | 0 | 0 | 0 | 1 | 0 | 0 | 1 | 0 | 1 | 1 | 1 | 0 |
| INXA | 0 | 1 | 1 | 0 | 0 | 0 | 0 | 0 | 0 | 0 | 0 | 0 | 1 | 0 | 1 | 0 | 1 | 0 | 0 | 1 | 0 | 0 |
| INXE | 0 | 1 | 0 | 1 | 0 | 0 | 0 | 0 | 0 | 0 | 0 | 0 | 0 | 1 | 1 | 0 | 1 | 0 | 0 | 1 | 0 | 0 |
| DCXA | 0 | 1 | 1 | 0 | 0 | 0 | 0 | 0 | 0 | 0 | 0 | 0 | 1 | 0 | 1 | 1 | 1 | 0 | 0 | 1 | 0 | 0 |
| DCXE | 0 | 1 | 0 | 1 | 0 | 0 | 0 | 0 | 0 | 0 | 0 | 0 | 0 | 1 | 1 | 1 | 1 | 0 | 0 | 1 | 0 | 0 |
| SHRA | 0 | 0 | 0 | 0 | 0 | 1 | 1 | 0 | 0 | 0 | 0 | 0 | 0 | 0 | 0 | 0 | 1 | 1 | 0 | 0 | 0 | 1 |
| SHLA | 0 | 0 | 0 | 0 | 1 | 0 | 1 | 0 | 0 | 0 | 0 | 0 | 1 | 0 | 0 | 0 | 1 | 1 | 0 | 0 | 0 | 1 |
| SHRE | 0 | 0 | 0 | 0 | 0 | 1 | 0 | 1 | 0 | 0 | 0 | 0 | 0 | 0 | 0 | 0 | 1 | 1 | 0 | 0 | 0 | 1 |
| CLRE | 0 | 1 | 0 | 1 | 0 | 1 | 0 | 0 | 0 | 0 | 0 | 0 | 0 | 0 | 0 | 0 | 0 | 1 | 0 | 0 | 0 | 1 |
| CLRA | 0 | 1 | 0 | 0 | 0 | 0 | 0 | 0 | 0 | 0 | 0 | 0 | 0 | 0 | 0 | 0 | 0 | 1 | 0 | 0 | 0 | 1 |
| CALL | 0 | 1 | 1 | 0 | 1 | 1 | 0 | 1 | 0 | 0 | 0 | 0 | 0 | 0 | 0 | 0 | 0 | 1 | 0 | 0 | 0 | 1 |
| ADRP | 0 | 1 | 1 | 0 | 0 | 0 | 0 | 0 | 0 | 0 | 0 | 0 | 0 | 1 | 0 | 0 | 1 | 1 | 1 | 1 | 0 | 1 |
| SBRP | 0 | 1 | 1 | 0 | 0 | 0 | 0 | 0 | 0 | 0 | 0 | 0 | 0 | 1 | 0 | 0 | 1 | 1 | 1 | 1 | 1 | 1 |
| SFAE | 0 | 0 | 0 | 0 | 0 | 0 | 0 | 0 | 0 | 0 | 0 | 0 | 0 | 1 | 0 | 0 | 1 | 1 | 1 | 0 | 1 | 1 |
| SFEA | 0 | 0 | 0 | 0 | 0 | 0 | 0 | 0 | 0 | 0 | 0 | 0 | 0 | 1 | 0 | 0 | 1 | 1 | 1 | 0 | 1 | 1 |
| SFNE | 0 | 0 | 0 | 0 | 0 | 0 | 0 | 0 | 0 | 0 | 0 | 0 | 0 | 1 | 0 | 0 | 1 | 1 | 1 | 0 | 1 | 1 |
| SFRA | 0 | 0 | 0 | 0 | 0 | 0 | 0 | 0 | 0 | 0 | 0 | 0 | 1 | 1 | 0 | 0 | 1 | 1 | 1 | 0 | 1 | 1 |
| SFNZ | 0 | 0 | 0 | 0 | 0 | 0 | 0 | 0 | 0 | 0 | 0 | 0 | 1 | 0 | 0 | 0 | 1 | 1 | 1 | 0 | 1 | 1 |
| SFAN | 0 | 0 | 0 | 0 | 0 | 0 | 0 | 0 | 0 | 0 | 0 | 0 | 1 | 0 | 0 | 0 | 1 | 1 | 1 | 0 | 1 | 1 |
| SFEN | 0 | 0 | 0 | 0 | 0 | 0 | 0 | 0 | 0 | 0 | 0 | 0 | 0 | 1 | 0 | 0 | 1 | 1 | 1 | 0 | 1 | 1 |
| SFED | 0 | 0 | 0 | 0 | 0 | 0 | 0 | 0 | 0 | 0 | 0 | 0 | 0 | 1 | 0 | 0 | 1 | 1 | 1 | 0 | 1 | 1 |
| STR 1 | 0 | 0 | 0 | 0 | 1 | 1 | 0 | 0 | 1 | 0 | 0 | 0 | 0 | 1 | 0 | 0 | 0 | 1 | 0 | 0 | 0 | 1 |
| 2 | 0 | 0 | 0 | 0 | 1 | 1 | 0 | 1 | 1 | 0 | 0 | 0 | 0 | 1 | | | | 1 | | | | 1 |

Table IV – Continued

| | Memory Input 22 | 21 | 20 | 19 | 18 | 17 | 16 | 15 | 14 | 13 | 12 | Memory Output 11 | 10 | 9 | 8 | 7 | 6 | 5 | 4 | Adder 3 | 2 | 1 |
|---|---|---|---|---|---|---|---|---|---|---|---|---|---|---|---|---|---|---|---|---|---|---|
| 3 | 0 | 0 | 0 | 0 | 1 | 1 | 1 | 0 | 1 | 0 | 0 | 0 | 0 | 1 | | | | 1 | | | | 1 |
| 4 | 0 | 0 | 0 | 0 | 1 | 1 | 1 | 1 | 1 | 0 | 0 | 0 | 0 | 1 | | | | 1 | | | | 1 |
| 5 | 0 | 0 | 0 | 0 | 1 | 1 | 0 | 0 | 1 | 1 | 0 | 0 | 0 | 1 | | | | 1 | | | | 1 |
| 6 | 0 | 0 | 0 | 0 | 1 | 1 | 0 | 1 | 1 | 1 | 0 | 0 | 0 | 1 | | | | 1 | | | | 1 |
| 7 | 0 | 0 | 0 | 0 | 1 | 1 | 1 | 0 | 1 | 1 | 0 | 0 | 0 | 1 | | | | 1 | | | | 1 |
| 8 | 0 | 0 | 0 | 0 | 1 | 1 | 1 | 1 | 1 | 1 | 0 | 0 | 0 | 1 | | | | 1 | | | | 1 |
| W | 0 | 0 | 0 | 0 | 1 | 1 | 0 | 0 | 0 | 1 | 0 | 0 | 0 | 1 | | | | 1 | | | | 1 |
| X | 0 | 0 | 0 | 0 | 1 | 1 | 0 | 1 | 0 | 1 | 0 | 0 | 0 | 1 | | | | 1 | | | | 1 |
| Y | 0 | 0 | 0 | 0 | 1 | 1 | 1 | 0 | 0 | 1 | 0 | 0 | 0 | 1 | | | | 1 | | | | 1 |
| Z | 0 | 0 | 0 | 0 | 1 | 1 | 1 | 1 | 0 | 1 | 0 | 0 | 0 | 1 | | | | 1 | | | | 1 |
| XFEM | 0 | 0 | 0 | 0 | 1 | 1 | 0 | 0 | 0 | 0 | 0 | 0 | 0 | 1 | | | | 1 | | | | 1 |
| XFEA | 0 | 0 | 0 | 0 | 1 | 1 | 1 | 0 | 0 | 0 | 0 | 0 | 0 | 1 | 0 | 0 | 0 | 1 | 0 | 0 | 0 | 1 |
| STRO | 0 | 0 | 0 | 0 | 1 | 1 | 1 | 1 | 0 | 0 | 0 | 0 | 0 | 1 | 0 | 0 | 0 | 1 | 0 | 0 | 0 | 1 |
| RCRI | 0 | 0 | 0 | 0 | 1 | 1 | 0 | 1 | 0 | 0 | 1 | 0 | 0 | 0 | 0 | 0 | 0 | 1 | 0 | 0 | 0 | 1 |
| 2 | | | | | 1 | 1 | 0 | 1 | | | 1 | 0 | 0 | 1 | | | 0 | 1 | | | | 1 |
| 3 | | | | | 1 | 1 | 0 | 1 | | | 1 | 0 | 1 | 0 | | | 0 | 1 | | | | 1 |
| 4 | | | | | 1 | 1 | 0 | 1 | | | 1 | 0 | 1 | 1 | | | 0 | 1 | | | | 1 |
| 5 | | | | | 1 | 1 | 0 | 1 | | | 1 | 1 | 0 | 0 | | | 0 | 1 | | | | 1 |
| 6 | | | | | 1 | 1 | 0 | 1 | | | 1 | 1 | 0 | 1 | | | 0 | 1 | | | | 1 |
| 7 | | | | | 1 | 1 | 0 | 1 | | | 1 | 1 | 1 | 0 | | | 0 | 1 | | | | 1 |
| 8 | | | | | 1 | 1 | 0 | 1 | | | 1 | 1 | 1 | 1 | | | 0 | 1 | | | | 1 |
| W | | | | | 1 | 1 | 0 | 1 | | | 0 | 1 | 0 | 0 | | | 0 | 1 | | | | 1 |
| X | | | | | 1 | 1 | 0 | 1 | | | 0 | 1 | 0 | 1 | | | 0 | 1 | | | | 1 |
| Y | | | | | 1 | 1 | 0 | 1 | | | 0 | 1 | 1 | 0 | | | 0 | 1 | | | | 1 |
| Z | | | | | 1 | 1 | 0 | 1 | | | 0 | 1 | 1 | 1 | | | 0 | 1 | | | | 1 |
| XFME | | | | | 1 | 1 | 0 | 1 | | | 0 | 0 | 0 | 0 | | | 0 | 1 | | | | 1 |
| XFAE | 0 | 0 | 0 | 0 | 1 | 1 | 0 | 1 | 0 | 0 | 0 | 0 | 1 | 0 | 0 | 0 | 0 | 1 | 0 | 0 | 0 | 1 |
| RCRO | 0 | 0 | 0 | 0 | 1 | 1 | 0 | 1 | 0 | 0 | 0 | 0 | 1 | 1 | 0 | 0 | 0 | 1 | 0 | 0 | 0 | 1 |

Table V

ADDER INPUTS/OUTPUTS

| Instruction | A IN | B IN | Time | OP | ADSO | ADBO |
|---|---|---|---|---|---|---|
| SFAE A>E | A | E | N,N Sign | Compare | Not Used | Not Used |
| SFEA E>A | A | E | | | | |
| SFNE A≠E | A | E | | | | |
| SFRA R>A | A | $R_o$ | | | | |
| SFNZ A≠0 | 0 | A | | | | |
| SFAN A≤0 | 0 | A | | | | |
| SFEN E≥0 | 0 | E | | | | |
| SFEO E=0 | 0 | E | | | | |
| STRN | 0 | E | All time | XF,XC | Not Used | E→N |
| XFEM | 0 | E | | | | E→M |
| XFEA | 0 | E | | | | E→A |
| RECALL N | 0 | N | | | | N→E |
| XFME | 0 | M | | | | M→E |
| XFAE | 0 | A | | | | A→E |
| XCEA | A | E | All time | XF,XC | A→E | E→A |
| XCMA | A | M | All time | XF,XC | A→M | M→A |
| ADDN | A | E | N,N sign | ADD | (A+E)→A | Not used(RC 8) |
| SUB N | A | E | N,N sign | SUB | (A−E)→A | |
| ADD X | A | E | Exp,E sign | ADD | (A+E)→A | |
| SUB X | A | E | Exp,E sign | SUB | (A−E)→A | |
| ADRP | A | E | N,N sign | ADRP | (A+E)→A | |
| SBRP | A | E | N,N sign | SBRP | (A−E)→A | |
| CHSN | 0 | E(N,SN) | N,N sign | XF,XC | Not Used | $E(N,\bar{s})$→E |
| CHSX | 0 | E(X,SN) | Exp,Exp.Sign | XF,XC | Not Used | $E(X,\bar{s})$→E |
| STXA | A | M | All time | XF,XC | Not Used | Not used |
| RCXA | A | M | All time | XF,XC | Not Used | Not used |
| INXA | +1 | A | Exp.Exp Sign | ADD | (1+A)→A | Not used |
| INXE | +1 | E | | ADD | (1+E)→E | |
| DCXA | −1 | A | | ADD | (−1+A)→A | |
| DCXE | −1 | E | | ADD | (−1+E)→E | |
| SHRA | 0 | M | N, N Sign | XF,XC | Not Used | Not Used |
| SHLA | 0 | A | N, N Sign | XF,XC | Not Used | A $\overline{AccIN}$ |
| SHRE | 0 | M | N, N Sign | XF,XC | Not Used | Not Used |
| CLRE | 0 | M | All time | XF,XC | 0→E | Not Used |
| CLRA | 0 | M | All time | | 0→A | Not Used |

Table VI

| | Reset | = | Σ7 | Σ8 | AR1 | AR2 | FC | DE1 | DE2 | PRINT | STN | RCN | XCN | RCDF2 |
|---|---|---|---|---|---|---|---|---|---|---|---|---|---|---|
| (1) Reset | X | KR | | | | | | | | | | | | |
| (2) = | X | X | X | X | OP Set = (F) | | | | | | | | | |
| (3) Σ7 | X | X | X | X | OP Set Σ7(F) | | | | | | | | | |
| (4) Σ8 | X | X | X | X | OP Set Σ8(F) | | | | | | | | | |
| (5) AR1 | X | PQ-SetARXFLA(F) Transfer K OP | | | OP-SetARXFLA(F) Transfer K OP | | | X | X | X | X | X | X | |
| (6) AR2 | X | PQ-SetARXFLM(F) Transfer K OP | | | OP-SetARXFLM(F) Transfer K OP | | | X | X | X | X | X | X | |
| (7) FC | KR | | | | | | | | | | X | X | X | |
| (8) DE1 | KQ (Numeric Code) | | | | | | | | | | KR | | | |
| (9) DE2 | KR | | | | | | | | | | | | | |
| (10) Print | KR | | | | | | | | | | | | | |
| (11) STN | NO OPERATION STORE STN in KR Set Flag | | | | | | | | | | | | | |
| (12) RCN | NO OPERATION STORE RCN in KR Set Flag | | | | | | | | | | | | | |
| (13) XCN | NO OPERATION STORE XCN in KR Set Flag | | | | | | | | | | | | | |
| (14) RCD, F2 | KR | | | | | | | | | | | | | |

KQ = Numeric key code output from Q register

PQ = Print " " " " "

KR = Indicated " " " K "

OP = Stored code output from OP register

AR1 includes +, −

AR2 = x, ÷, $a^x$, ∠,

FC = sin/cos, $\sin^{-1}/\cos^{-1}$, radian conversion, $\log_{10}/\ln$, $\frac{1}{x}$, $\sqrt{\ }$, X1, $\Sigma_n^2$, R→θ

DE1 = numeric keys

DE2 = change sign, decimal point, exponent, π, ε, clear

PRINT = STO, PT

Table VII

FLAG LIST

| NAME | DESCRIPTION | SET BY | RESET BY | | SKIPS |
|---|---|---|---|---|---|
| FL 1 | GENERAL PURPOSE FLAG | COMPARES & SWITCHES | SKF1 | RSFL | SKF1 |
| FL 2 | DECIMAL POINT FLAG | SFL2 | □ □ | RSFL | SKF2 |
| FL 3 | EXPONENT FLIP FLOP | SFL3 | □ □ | RSFL | SKF3 |
| FL 4 | EXPONENT FLAG | SFL4 | RFL4 | RSFL | SKF4 |
| FL 5 | KEY FLAG | SFL5 | □ □ | RSFL | SKF5 |
| FL 6 | PRINT FLAG | SFL6 | RFL6 | RSFL | SKF6 |
| FL 7 | SIGN FLAG | SFL7 | □ □ | RSFL | SKF7 |
| FL 8 | PRINT INHIBIT FLAG | SFL8 | RFL8 | RSFL | SKF8 |
| FL A | EQUALS FLAG | [=] KEY | STOP | RSFL | SKFA |
| FL B | Σ+ FLAG | [Σ] KEY | STOP | RSFL | SKFB |
| FL C | Σ- FLAG | [Σ] KEY | STOP | RSFL | SKFC |
| FL D | TRANSFER E→M FLAG | Keyboard Logic | STOP | RSFL | SKFD |
| FL E | TRANSFER E→A. flag | Keyboard Logic | STOP | RSFL | SKFE |
| FL F | | SFLF | □ RFLF | RSFL | SKFF |

FLAG 1 SET BY:-

| COMPARES | SWITCHES |
|---|---|
| STAE | SFS1 |
| STEA | SFS2 |
| STNE | SFS3 |
| STRA | SFS4 |
| STNI | SFS5 |
| STAN | SFS6 |
| STEN | SFS7 |
| STEO | SFS8 |

※ NOTE: On machine without printer, flag 8 (print inhibit) must be held PERMANENTLY SET □, Reset by entry to any routine, EXCEPT numeral, sign, Exp, Dec Pt.

□, Reset by any ST, RC, or XF (0010XXXX or 0011XXXX)

Table VIII

COLUMN 00

| | | | | | |
|---|---|---|---|---|---|
| 00 | STOP | | 32 | BR 02,16 | (ADD) |
| 01 | STRO | (STORE 0) | 33 | JU 17 | |
| 02 | BR06,48 | | 34 | BR 03,32 | (SUBT) |
| 03 | STOP | | 35 | JU 17 | |
| 04 | BR05,48 | (CL.ALL) | 36 | BR 12,32 | |
| 05 | BR04,00 | (STORE N) | 37 | JU 18 | |
| 06 | BR06,16 | (PRINT E) | 38 | BR 00,48 | |
| 07 | BR04,32 | (PRINT ALL) | 39 | JU 18 | |
| 08 | JU 22 | (EXCH N) | 40 | BR 03,00 | (MULT) |

Table VIII—Continued

COLUMN 00

| | | | | | |
|---|---|---|---|---|---|
| 09 | BR05,00 | (RECALL N) | 41 | JU 18 | |
| 10 | RCRO | (RECALL 0) | 42 | BR 07,32 | (DIVIDE) |
| 11 | BR06,48 | | 43 | JU 18 | |
| 12 | CHPG | (SPL N) | 44 | BR 10,16 | ($A^x$) |
| 13 | BR04,00 | | 45 | JU 18 | |
| 14 | RCRW | (FUNC 2) | 46 | CHPG | (ARCTAN) |
| 15 | BR06,48 | | 47 | JU 36 | |
| 16 | | | 48 | BR 14,00 | (SIN/COS) |
| 17 | XFAE | | 49 | JU 18 | |
| 18 | BR06,32 | | 50 | BR 09,32 | (Arc Sin/Acos) |
| 19 | CLRE | | 51 | JU 18 | |
| 20 | RFLA | | 52 | BR 13,32 | (X1) |
| 21 | BR06,48 | | 53 | JU 18 | |
| 22 | CHPG | | 54 | BR 13,00 | (R→θ) |
| 23 | BR13,00 | | 55 | JU 18 | |
| 24 | BR01,00 | (NUMERAL) | 56 | BR 08,00 | (LOG) |
| 25 | (STOP) | | 57 | JU 18 | |
| 26 | BR07,32 | (Dec.Pt.) | 58 | CHPG | ($\Sigma_x^2$) |
| 27 | BR01,32 | (SIGN) | 59 | JU 36 | |
| 28 | BR06,00 | (EXP) | 60 | BR 09,16 | ($1/x$) |
| 29 | JU 19 | (CLEAR E) | 61 | JU 18 | |
| 30 | BR14,32 | (ε) | 62 | BR 12,00 | ($\sqrt{x}$) |
| 31 | BR14,16 | (π) | 63 | JU 18 | |

COLUMN 01

| | | | | | |
|---|---|---|---|---|---|
| 00 | NUMERAL | SKF3 | 32 | SIGN | SKF3 |
| 01 | | JU54 | 33 | | JU36 |
| 02 | | SKF4 | 34 | | CHSX |
| 03 | | JU35 | 35 | | RCLP |
| 04 | | RFL4 | 36 | | CHSN |
| 05 | | XFIE | 37 | | SFL7 |
| 06 | | XCEA | 38 | | RCLP |
| 07 | | STRZ | 39 | | SFLA |
| 08 | | XCEA | 40 | | JU57 |
| 09 | | RCXA | 41 | | SFEO |
| 10 | | XCEA | 42 | | SKF1 |
| 11 | | ADDX | 43 | | JU60 |
| 12 | | RCRZ | 44 | | SK10 |
| 13 | | SFL5 | 45 | | JU57 |
| 14 | | SFL3 | 46 | | RCLP |
| 15 | | JU62 | 47 | | |
| 16 | JUSTIFY | RSI2 | 48 | JUSTIFY E | XCEA |
| 17 | | SKDO | 49 | | BR01,16 |
| 18 | | JU25 | 50 | | RFLF |
| 19 | | INXA | 51 | | XCEA |
| 20 | | JU28 | 52 | | RCLP |
| 21 | | DCXA | 53 | | |
| 22 | | SKLD | 54 | | BR03,16 |
| 23 | | JU30 | 55 | | SKF2 |
| 24 | | INI2 | 56 | | JU41 |
| 25 | | SHLA | 57 | | XFIE |
| 26 | | SKDO | 58 | | INI2 |
| 27 | | JU21 | 59 | | RCLP |
| 28 | | SHRA | 60 | | INXE |
| 29 | | RCLP | 61 | | JU57 |
| 30 | | CLRA | 62 | | INI2 |
| 31 | | RCLP | 63 | | JU51 |

COLUMN 02

| | | | | | |
|---|---|---|---|---|---|
| 00 | NORM | SFEO | 32 | DIVIDE | RFL4 |
| 01 | | SKF1 | 33 | | XCEA |
| 02 | | JU 04 | 34 | | BR 01,16 |
| 03 | | RCLP | 35 | | XFAE |
| 04 | | SFNZ | 36 | | BR 04,48 |
| 05 | | SKF1 | 37 | | BR 07,48 |
| 06 | | JU 12 | 38 | | SFNZ |
| 07 | | SUBX | 39 | | SKF1 |
| 08 | | SKXP | 40 | | JU 14 |
| 09 | | JU 21 | 41 | | XCEA |
| 10 | | SKXO | 42 | | RSI2 |
| 11 | | JU 25 | 43 | | BR 03,48 |
| 12 | | ADDX | 44 | | CLRA |
| 13 | | RCLP | 45 | | RCXA |
| 14 | | SERR | 46 | | SUBX |
| 15 | | RCLP | 47 | | XCHA |

Table VIII – Continued

COLUMN 02

| | | | | | |
|---|---|---|---|---|---|
| 16 | ADD | BR 04,48 | 48 | | RSI1 |
| 17 | | BR 02,00 | 49 | | SBRP |
| 18 | | ADDM | 50 | | XFIM |
| 19 | | BR 01,16 | 51 | | SKLD |
| 20 | | RCLP | 52 | | JU 56 |
| 21 | | ADDX | 53 | | INI2 |
| 22 | | SHRA | 54 | | SHLA |
| 23 | | IXXA | 55 | | JU 48 |
| 24 | | JU 07 | 56 | | XCHA |
| 25 | | ADDX | 57 | | BR 01,16 |
| 26 | | SHRE | 58 | | XFAE |
| 27 | | INXE | 59 | | SKF4 |
| 28 | | JU 07 | 60 | | JU 10 |
| 29 | | RFLA | 61 | | CHSN |
| 30 | | XFEM | 62 | | XFEA |
| 31 | | RCLP | 63 | | JU 29 |

COLUMN 03

| | | | | | |
|---|---|---|---|---|---|
| 00 | MULT | JU 39 | 32 | SUBT | BR 04,48 Print Er |
| 01 | | RSI2 | 33 | | BR 02,00 Norm |
| 02 | | CLRA | 34 | | SUBN |
| 03 | | XCHA | 35 | | BR 01,16 Justify |
| 04 | | JU 26 | 36 | | RCLP |
| 05 | | ADDK | 37 | | XCHA |
| 06 | | XCEA | 38 | | RCLP |
| 07 | | XCHA | 39 | | XCEA |
| 08 | | ADDX | 40 | | BR 01,16 Justify |
| 09 | | LDIX | 41 | | XFAE |
| 10 | | ADRP | 42 | | BR 04,40 |
| 11 | | SKLD | 43 | | XTAE |
| 12 | | JU 45 | 44 | | JU 01 |
| 13 | | SHRE | 45 | | BR 01,14 |
| 14 | | INI2 | 46 | | XFAE |
| 15 | | JU 09 | 47 | | RCLP |
| 16 | KEY FLAG | SKF1 | 48 | DIV CORR | SFEA |
| 17 | | JU 19 | 49 | | SKF1 |
| 18 | | JU 56 | 50 | | JU 53 |
| 19 | | CLRE | 51 | | SHLA |
| 20 | | SFL5 | 52 | | DCXA |
| 21 | | RSI2 | 53 | | STXA |
| 22 | | SKF7 | 54 | | JU 37 |
| 23 | | JU 62 | 55 | | SKF4 |
| 24 | | CHSN | 56 | | JU 59 |
| 25 | | JU 62 | 57 | | SERR |
| 26 | | SFAN | 58 | | RCLP |
| 27 | | SKF1 | 59 | | SKLD |
| 28 | | JU 30 | 60 | | SFL4 |
| 29 | | CHSN | 61 | | RCLP |
| 30 | | XCEA | 62 | | RFLA |
| 31 | | JU 05 | 63 | | RCLP |

Table IX

ADDITION

| | | | |
|---|---|---|---|
| 9972.1 | (E) | 0.582 | 01 |
| + 85.02 | (A) | 9.9721 | 03 |

On Depression of + Key after, + Key, Compiler Presets P Counter

| | P Counter | Instruction | TO Col 0, Line 32 |
|---|---|---|---|
| (1) | 0032 | BR 02,16 | Branch to Col 2, Line 16 (ADD SUBROUTINE) |
| (2) | 0216 | BR 04,48 | Branch to Col 4, Line 48 (PRINT EXAMINE SUBROUTINE) (Causes Print of Contents of E Register) |
| (3) | 0217 (norm) | BR 02,200 | Branch to Col 2, Line 00 (NORMALIZE ROUTINE) |
| (4) | 0200 | SFEO | Set Flag $_1$ if E=0 (E≠0, ∴ FLAG NOT SET) |
| (5) | 0201 | SKF1 | Skip if Flag$_1$ Set (Flag Not SET ∴ Do Not Skip) |
| (6) | 0202 | JU 04 | Jump to Step 4 |
| (7) | 0204 | SFNZ | Set Flag/If Acc ≠ 0 (Acc ≠ 0 ∴ Flag, Set) |
| (8) | 0205 | SKF1 | Skip if Flag/ Set (Flag Set ∴ Skip) |
| (9) | 0207 | SUBX | Subt Exp. of E from Exp of A |
| | | | (E) 0.582 01 |
| | | | (A) 9.9721 02 |
| (10) | 0208 | SKXP | SKIP IF Exp. Acc Positive (Exp. A pos, ∴ Skip) |
| (11) | 0210 | SKXO | " " " " Zero (Exp. A ≠ 0 ∴ Do Not Skip |
| (12) | 0211 | JU 25 | Jump to Step 25 |
| (13) | 0225 | ADDX | ADD Exp E to Exp A |
| | | | (E) 0.582 01 |
| | | | (A) 9.9721 03 |

Table IX – Continued

| | | | | |
|---|---|---|---|---|
| (14) | 0226 | SHRE | Shift Right E | |
| | | | (E) 0.4582 | 01 |
| | | | (A) 9.9721 | 03 |
| | 0227 | | | |
| (15) | INXE | INXE | Increment Exp E | |
| | | | (E) 0.0582 | 02 |
| | | | (A) 9.9721 | 03 |
| (16) | 0228 | JU 07 | Jump to Step 7 | |
| (17) | 0207 | SUBX | Subt. Exp. E from Exp. A | |
| | | | (E) 0.0582 | 02 |
| | | | (A) 9.9721 | 01 |
| (18) | 0208 | SKXP | SKIP IF EXP. A POSITIVE (Exp A pos, ∴ skip) | |
| (19) | 0210 | SKXO | SKIP IF EXP. A ZERO (Exp. A, ≠ Zero ∴ Do Not S | |
| (20) | 0211 | JU 25 | JUMP TO STEP 25 | |
| (21) | 0225 | ADDX | ADD EXP E TO EXP. A | |
| | | | (E) 0.0582 | 02 |
| | | | (A) 9.9721 | 03 |
| (22) | 0226 | SHRE | SHIFT RIGHT E | |
| | | | (E) 0.08582 | 02 |
| | | | (A) 9.9721 | 03 |
| (23) | 0227 | INXE | INCREMENT EXP E. | |
| | | | (E) 0.08582 | 03 |
| | | | (A) 9.9721 | 03 |
| (24) | 0228 | JU 07 | JUMP TO STEP 7 | |
| (25) | 0207 | SUBX | SUBT EXP E FROM EXP A | |
| | | | (E) 0.08582 | 03 |
| | | | (A) 9.9721 | 00 |
| (26) | 0208 | SKXP | SKIP IF EXP A POS (Exp. A pos, ∴ Skip) | |
| (27) | 0210 | SKXO | SKIP IF EXP A ZERO (Exp. A Zero ; Skip) | |
| (28) | 0212 | ADDX | | |
| | | | (E) 0.08582 | 03 |
| | | | (A) 9.9721 | 03 |
| (29) | 0213 | RCLP | RECALL P (NORMALIZE COMPLETE, RETURN TO ADD) | |
| (30) | 0218 | ADDN | ADD MANTISSA E TO A | |
| | | | (E) 0.08582 | 03 |
| | | | (A) 10.05792 | 03 |
| (31) | 0219 | BR21,16 | BRANCH TO COL. 1, Line 16 (JUSTIFY ROUTINE) | |
| (32) | 0116 | RSI2 | RESET INDEX 2 | |
| (33) | 0117 | SKD0 | SKIP IF DIGIT IN $D_o$ POSITION OF A (1 in $D_o$ Position, | |
| (34) | 0119 | INXA | INCREMENT EXP. A | |
| | | | (E) 0.08582 | 03 |
| | | | (A) 10.05792 | 04 |
| (35) | 0120 | JU 28 | JUMP TO STEP 28 | |
| (36) | 0126 | SHRA | SHIFT RIGHT A | |
| | | | (E) 0.08582 | 03 |
| | | | (A) 1.005792 | 04 |
| (37) | 0129 | RCLP RECALL P | JUSTIFY SUBROUTINE COMPLETE, RETURN TO ADD) | |
| (38) | 0220 | RCLP RECALL P | (ADD SUBROUTINE COMPLETE, RETURN TO KEY ADD) | |

Table X

LEARN MODE PROGRAMMER SWITCHES AND INDICATORS

| SWITCH OR INDICATOR | PUSHBUTTON ACTION | FUNCTIONS |
|---|---|---|
| TO( ) (Go to Starting location (n)) | Momentary | Pressing the TO( ) key followed by a single decimal digit, 0 through 7, forms a branch instruction occupying one program memory location. Executing the instruction sets the program counter (P) to the starting address of the location defined by the decimal digit entry (0 through 7) |
| LOAD | Latch | When engaged, the LOAD switch allows a program to be entered either from the keyboard or from the card reader. When loading a program a Go-to instruction (TO( ) key followed by decimal digit) must be executed, prior to engaging the LOAD switch, to specify the starting location of the program. When the LOAD switch is disengaged, the LEMP is in the Run mode. |
| RESUME (Start program execution) | Momentary | Pressing the RESUME switch starts the program counter. In the LOAD mode, the RESUME key is pressed to advance the P counter while verifying a program. To start program execution in the Run mode the RESUME key is pressed after executing TO( ). After a HALT during program execution (to enter data or a keyboard function), the RESUME key is pressed to continue executing the remainder of the program. During the STEP mode, the RESUME key is pressed to execute each step in the program. |
| HALT | Momentary | Pressing the HALT switch enters the HALT instruction into the program memory. HALT is used at the end of each program to stop execution but also may be used within a program as a pause to enter data or a keyboard function. In the latter case, the RESUME key must be pressed, after the new data entry, to continue program execution. |

Table X – Continued

LEARN MODE PROGRAMMER SWITCH AND INDICATORS

| SWITCH OR INDICATOR | PUSHBUTTON ACTION | FUNCTIONS |
|---|---|---|
| RECALL P | Momentary | Pressing the RECALL P switch enters RECALL P instruction into the program memory. The RECALL P instruction returns the program to the main routine at the end of a sub-routine. Control is transferred to the program location immediately following the branch instruction that initiated the sub-routine execution. |
| STEP | Latch | When engaged, STEP allows a program to be executed one step at a time. The STEP mode may be used to verify a program by observing the contents of the P counter and the instruction register during execution of each step. The STEP switch must be disengaged for automatic program execution (continuous mode). |
| SENSE | Latch | Used only when a card reader is connected to the LEMP, the SENSE latch allows the operator to communicate with the calculator in a non-numeric manner. See machine instruction SET FLAG IF SENSE SET (SFS4). |
| P | Latch (Rocker with latch I) | When engaged, the indicators monitor the contents of the program counter 74. |
| I | Latch (Rocker with latch P) | When engaged, indicators monitor the contents of the instruction register 66. |
| Indicators (eight neon) | —— | Arranged in octal notation, the indicators reflect either the contents of the P counter or the contents of the instruction register depending on whether latch P or latch I is engaged. If neither latch is engaged, the lights are out. |

Table XI

| STEP | | MNEMONIC | CODE M LSD | REMARKS |
|---|---|---|---|---|
| 0 | 0 | HALT | 4 2 1 | Enter R. |
| | 1 | ST(n) | 0 5 | |
| | 2 | 0 | 2 0 | |
| | 3 | $a^x$ | 5 4 | |
| | 4 | 2 | 2 2 | $R^2$ |
| | 5 | × | 5 0 | |
| | 6 | 4 | 2 4 | $4R^2$ |
| | 7 | × | 5 0 | |
| 1 | 0 | π | 1 7 | $4\pi R^2$ |
| | 1 | * | 0 0 | |
| | 2 | PrintE | 0 6 | Surface |
| | 3 | × | 5 0 | |
| | 4 | RCL(0) | 1 2 | $4\pi R^3$ |
| | 5 | ÷ | 5 2 | |
| | 6 | 3 | 2 3 | $\frac{4\pi R^3}{3}$ |
| | 7 | * | 0 0 | |
| 2 | 0 | PrintE | 0 6 | Volume |
| | 1 | Branch0 | 7 4 0 | |

The program above solves the following problem:

Enter a value r and compute the volume and surface of a sphere. Print both answers and return to the entry position to allow a new value for r to be entered.

What we claim is:

1. An electronic calculator apparatus comprising:

a data memory including a plurality of data registers, each having an input terminal and an output terminal;

a data output bus;

a source of input data;

memory output control means responsive to register output select information identifying one of said registers for coupling the output terminal thereof to said data output bus;

memory input control means responsive to register input select information identifying one of said registers for coupling the input terminal thereof to said source of input data;

a control memory having a plurality of addressable locations, each adapted to store a control word containing register output select information and register input select information;

a program memory having a plurality of addressable locations adapted to store instructions including data modification instructions, each identifying one of said control memory locations;

a program counter capable of defining a plurality of counts, each identifying a different one of said program memory locations;

means responsive to said program counter for reading the instruction stored in the program memory location identified by the count defined by said program counter;

means responsive to a data modification instruction read from said program memory for reading the control word stored in the control memory location identified by said data modification instruction; and means responsive to a control word read from said control memory for coupling the register output select information and the register input select information contained therein to said memory output control means and said memory input control means, respectively.

2. The apparatus of claim 1 wherein said control memory and said program memory each comprises a read-only memory.

3. The apparatus of claim 1 wherein said control word is comprised of a plurality of binary digits; and wherein said memory output control means includes a shift register and said memory input control means includes a shift register; and wherein said means for reading said control word includes means for serially providing the binary digits thereof to the input of one of said shift registers and for coupling the serial output from that shift register to the input of the other of said shift registers.

4. The apparatus of claim 1 wherein said means responsive to said data modification instruction includes an instruction register;

means for entering instructions read from said program memory into said instruction register; and decoder means coupled to said instruction register and responsive to a data modification instruction entered therein for selecting a control memory location for reading.

5. The apparatus of claim 4 including timing means for periodically incrementing said program counter count by one.

6. The apparatus of claim 5 wherein said instructions adapted to be stored by said program memory include address modification instructions; and logic means coupled to said instruction register and responsive to an address modification instruction entered therein for modifying the count defined by said program counter.

7. The apparatus of claim 6 including a program count storage means;

means responsive to at least one address modification instruction adapted to be entered into said instruction register for storing a count in said program count storage means related to the count defined by said program counter; and means responsive to at least one instruction adapted to be entered into said instruction register for recalling from said program count storage means the last count stored therein.

8. The apparatus of claim 1 including an adder having at least first and second inputs and an output;

said source of input data including said adder output; and means respectively coupling the output terminal of one of said registers and said data output bus to said first and second adder inputs.

9. The apparatus of claim 8 including adder control means responsive to mode control information for controlling the operational characteristics of said adder; and wherein each of said control words includes mode control information.

10. The apparatus of claim 3 including an adder having at least first and second inputs and an output;

said source of input data including said adder output; and means respectively coupling the output terminal of one of said registers and said data output bus to said first and second adder inputs.

11. The apparatus of claim 10 including adder control means responsive to mode control information for controlling the operational characteristics of said adder; and wherein each of said control words includes mode control information;

said adder control means including a shift register; and means for coupling the serial output from said other of said shift registers to the input of said adder control means shift register.

12. An electronic calculator comprising:

a plurality of keys, each adapted to be individually actuated to generate a unique multibit key code;

compiler means including at least first and second registers, each adapted to store one of said multibit key codes, said compiler means including means for initially storing each generated key code in said first register;

an output gating means;

means coupling the outputs of said first and second registers to said output gating means;

decode and logic means responsive to a first type of generated key code for causing said output gating means to pass the contents of said first register, and responsive to a second type of generated key code for transferring the contents of said first register to said second register and responsive to a third type of generated key code for causing said output gating means to pass the contents of said second register;

an instruction register; and means coupling the output of said output gating means to said instruction register.

13. The calculator of claim 12 wherein the bits of said key codes are passed by said output gate and transferred between said first and second registers in serial fashion.

14. The calculator of claim 12 wherein said decode and logic means is further responsive to each of a plurality of generated key codes of a fourth type for causing said output gating means to pass a code generic to said fourth-type codes.

15. The calculator of claim 14 including a program memory having a plurality of addressable locations, each adapted to store an instruction;

means for selectively reading instructions from said program memory; and means for coupling instructions read from said program memory to said instruction register.

16. The calculator of claim 15 including a program counter capable of defining a plurality of counts, each identifying a different one of said program memory locations; and wherein said means for reading instructions from said program memory is responsive to the count defined by said program counter.

17. The calculator of claim 16 including:

a data memory including a plurality of data registers, each having an input terminal and an output terminal;

a data output bus;

a source of input data;

memory output control means responsive to register output select information identifying one of said registers for coupling the output terminal thereof to said data output bus;

memory input control means responsive to register input select information identifying one of said registers for coupling the input terminal thereof to said source of input data;

a control memory having a plurality of addressable locations, each adapted to store a control word containing register output select information and register input select information;

said program memory adapted to store data modification instructions each identifying one of said control memory locations;

means responsive to a data modification instruction read from said program memory for reading the control word stored in the control memory location identified by said data modification instruction; and means responsive to a control word read from said control memory for coupling the register output select information and the register input select information contained therein to said memory output control means and said memory input control means, respectively.

18. The calculator of claim 17 wherein said control memory and said program memory each comprises a read only memory.

19. The calculator of claim 17 wherein said control word is comprised of a plurality of binary digits; and wherein said memory output control means includes a shift register and said memory input control means includes a shift register; and wherein said means for reading said control word includes means for serially providing the binary digits thereof to the input of one of said shift registers and for coupling the serial output from that shift register to the input of the other of said shift registers.

20. An electronic calculator apparatus including:

a program memory having a first read-only portion and a second alterable portion, each portion including a plurality of addressable locations each capable of storing an instruction code;

program counter means capable of defining a plurality of different counts each uniquely identifying one of said addressable locations in said program memory;

instruction register means;

decoding means responsive to said program counter means for accessing an instruction coded from the location in said program memory uniquely identified by the count defined by said program counter means;

means responsive to instruction codes accessed from said program memory for entering an instruction code into said instruction register means; and means responsive to an instruction code entered into said instruction register for modifying the count in said program counter means.

21. The calculator apparatus of claim 20 including:

a plurality of keys, each individually actuatable to generate a unique key code; and compiler logic means responsive to key codes applied thereto for entering an instruction code into said instruction register means.

22. The calculator apparatus of claim 21 wherein said means responsive to said instruction codes accessed from said program memory includes means for applying codes accessed from said program memory alterable portion to said compiler logic means for entering an instruction code into said instruction register means.

23. The calculator apparatus of claim 20 including:

keyboard means having a plurality of keys each individually actuatable to generate signals manifesting a unique keyboard instruction code;

storage means adapted to store keyboard instruction codes and internal instruction codes;

means for reading said storage means to generate signals manifesting said stored keyboard and internal instruction codes; and means responsive to said signals generated by said keyboard means and means for reading for storing representations of the codes manifested by said signals in said alterable portion of said program memory.

24. The calculator apparatus of claim 23 wherein said means responsive to instruction codes accessed from said program memory includes a compiler logic means responsive to keyboard instruction codes accessed from said program memory alterable portion for entering an internal level instruction code into said instruction register means.

25. The calculator apparatus of claim 20 including a data memory including a plurality of data registers, each having an input terminal and an output terminal;

a data output bus;

a source of input data;

memory output control means responsive to register output select information identifying one of said registers for coupling the output terminal thereof to said data output bus;

memory input control means responsive to register input select information identifying one of said registers for coupling the input terminal thereof to said source of input data;

a control memory having a plurality of addressable locations, each adapted to store a control word containing register output select information and register input select information;

said program memory adapted to store data modification instructions each identifying one of said control memory locations;

means responsive to a data modification instruction read from said program memory for reading the control word stored in the control memory location identified by said data modification instruction; and means responsive to a control word read from said control memory for coupling the register output select information and the register input select information contained therein to said memory output control means and said memory input control means, respectively.

26. The calculator apparatus of claim 25 including:

keyboard means having a plurality of keys each individually actuatable to generate signals manifesting a unique keyboard instruction code;

storage means adapted to store keyboard instruction codes and internal instruction codes;

means for reading said storage means to generate signals manifesting said stored keyboard and internal instruction codes; and means responsive to said signals generated by said keyboard means and mans for reading for storing representations of the codes manifested by said signals in said alterable portion of said program memory.

27. The calculator apparatus of claim 26 wherein said means responsive to instruction codes accessed from said program memory includes a compiler logic means responsive to keyboard instruction codes accessed from said program memory alterable portion for entering an internal level instruction code into said instruction register means.